US00RE46684E

(19) United States
(12) Reissued Patent
Cheng et al.

(10) Patent Number: US RE46,684 E
(45) Date of Reissued Patent: *Jan. 23, 2018

(54) CODING TECHNIQUES USING ESTIMATED SPECTRAL MAGNITUDE AND PHASE DERIVED FROM MDCT COEFFICIENTS

(71) Applicant: Dolby Laboratories Licensing Corporation, San Francisco, CA (US)

(72) Inventors: Corey I. Cheng, Framingham, MA (US); Michael J. Smithers, Kareela (AU); David N. Lathrop, Fremont, CA (US)

(73) Assignee: Dolby Laboratories Licensing Corporation, San Francisco, CA (US)

( * ) Notice: This patent is subject to a terminal disclaimer.

(21) Appl. No.: 13/675,998

(22) Filed: Nov. 13, 2012

Related U.S. Patent Documents

Reissue of:
(64) Patent No.: 6,980,933
Issued: Dec. 27, 2005
Appl. No.: 10/766,681
Filed: Jan. 27, 2004

U.S. Applications:
(63) Continuation of application No. 13/297,256, filed on Nov. 15, 2011, now Pat. No. Re. 44,126, which is an application for the reissue of Pat. No. 6,980,933, and a continuation of application No. 11/963,680, filed on (Continued)

(51) Int. Cl.
*G10L 21/00* (2013.01)
*G06F 17/14* (2006.01)
*G10L 19/02* (2013.01)

(52) U.S. Cl.
CPC ..... *G06F 17/147* (2013.01); *G10L 19/0212* (2013.01)

(58) Field of Classification Search
CPC ..... G06F 17/147; G10L 19/0212
See application file for complete search history.

(56) References Cited

U.S. PATENT DOCUMENTS 5,285,498 A * 2/1994 Johnston ..... 381/2
5,297,236 A * 3/1994 Antill et al. ..... 704/203
5,451,954 A * 9/1995 Davis et al. ..... 341/200

(Continued)

FOREIGN PATENT DOCUMENTS

JP 2000/048481 2/2000

OTHER PUBLICATIONS

Duhamel et al., "A Fast Algorithm for the Implementation of Filter Banks Based on Time Domain Aliasing Cancellation" Int. Conf on Acoust., Speech and Sig. Proc., Toronto, May 1991, vol. 3, pp. 2209-2212.

(Continued)

*Primary Examiner* — Mary Steelman

(57) ABSTRACT

Estimates of spectral magnitude and phase are obtained by an estimation process using spectral information from analysis filter banks such as the Modified Discrete Cosine Transform. The estimation process may be implemented by convolution-like operations with impulse responses. Portions of the impulse responses may be selected for use in the convolution-like operations to trade off between computational complexity and estimation accuracy. Mathematical derivations of analytical expressions for filter structures and impulse responses are disclosed.

18 Claims, 3 Drawing Sheets

Related U.S. Application Data

Dec. 21, 2007, now Pat. No. Re. 42,935, which is an application for the reissue of Pat. No. 6,980,933.

(56) References Cited

U.S. PATENT DOCUMENTS

| | | | | |
|---|---|---|---|---|
| 5,481,614 | A * | 1/1996 | Johnston | 381/2 |
| 5,592,584 | A * | 1/1997 | Ferreira et al. | 704/203 |
| 5,627,938 | A * | 5/1997 | Johnston | 704/200.1 |
| 5,682,463 | A * | 10/1997 | Allen et al. | 704/230 |
| 5,699,479 | A * | 12/1997 | Allen et al. | 704/205 |
| 5,699,484 | A * | 12/1997 | Davis | 704/200.1 |
| 5,727,119 | A * | 3/1998 | Davidson et al. | 704/203 |
| 5,945,940 | A * | 8/1999 | Cuomo | 342/90 |
| 6,035,177 | A * | 3/2000 | Moses et al. | 725/22 |
| 6,131,084 | A * | 10/2000 | Hardwick | 704/230 |
| 6,161,089 | A * | 12/2000 | Hardwick | 704/230 |
| 6,182,030 | B1 * | 1/2001 | Hagen et al. | 704/201 |
| 6,266,644 | B1 * | 7/2001 | Levine | 704/503 |
| 6,453,289 | B1 * | 9/2002 | Ertem et al. | 704/225 |
| 6,680,972 | B1 * | 1/2004 | Liljeryd et al. | 375/240 |
| 6,847,737 | B1 * | 1/2005 | Kouri et al. | 382/260 |
| 6,862,326 | B1 * | 3/2005 | Eran et al. | 375/343 |
| 6,980,933 | B2 | 12/2005 | Cheng et al. | |
| 7,242,710 | B2 * | 7/2007 | Ekstrand | 375/232 |
| 7,707,030 | B2 * | 4/2010 | Edler et al. | 704/211 |
| 7,783,032 | B2 * | 8/2010 | Abutalebi et al. | 379/406.09 |
| RE42,935 | E | 11/2011 | Cheng et al. | |
| 8,155,954 | B2 * | 4/2012 | Edler et al. | 704/211 |
| 2003/0016772 | A1 * | 1/2003 | Ekstrand | 375/350 |
| 2003/0093282 | A1 | 5/2003 | Goodwin | |
| 2004/0071284 | A1 * | 4/2004 | Abutalebi et al. | 379/406.08 |
| 2004/0078205 | A1 * | 4/2004 | Liljeryd et al. | 704/503 |
| 2005/0197831 | A1 * | 9/2005 | Edler et al. | 704/202 |
| 2010/0161319 | A1 * | 6/2010 | Edler et al. | 704/200.1 |

OTHER PUBLICATIONS

Wang et al., "Some Peculiar Properties of the MDCT," Proc. of 5$^{th}$ Int. Conf. on Sig. Proc., Beijing, Aug. 2000, vol. 1, pp. 61-64.

Ferreira, "Combined Spectral Envelope Normalization & Substraction of Sinusoidal Components on the ODFT & MDCT Frequency Domains," Proc. 2001 IEEE Appl. of Sig. Proc. to Audio & Acoust., NY, Oct. 2001, pp. 51-54.

Wang et al., "Modified Discrete Cosine Transform—Its Implications for Audio Coding and Error Concealment," J. Audio Eng. Soc., vol. 51, No. 112, Jan./Feb. 2003, pp. 52-61.

Kresch, R., et al., "Fast DCT Domain Filtering Using the DCT and the DCT," IEEE Transactions on Image Processing, IEEE Inc., New York, US, vol. 8, No. 6, Jun. 1999; pp. 821-833.

Princen et al., "Analysis/Synthesis Filter Bank Design Based on Time Domain Aliasing Cancellation," IEEE Trans. on Acoust., Speech, Signal Proc., vol. ASSP-34, 1986, pp. 1153-1161.

Bosi et al., "ISO/IEC MPEG-2 Advanced Audio Coding," J. Audio Eng. Soc., vol. 45, No. 10, Oct. 1997, pp. 789-814.

Lanciani et al., "Subband-Domain Filtering of MPEG Audio Signals," Proc. of 1999 Int. Conf on Acoust., Speech and Signal Proc., Phoenix, AZ, Mar. 1999, vol. 2, pp. 917-920.

Wang et al., "On the Relationship Between MDCT, SDFT and DFT," Proc. of 5th Int. Conf. on Sig. Proc., Beijing, Aug. 2000, vol. 1, pp. 44-47.

Ferreira, "Accurate Estimation in the ODFT Domain of the Frequency, Phase and Magnitude of Stationary Sinusoids," IEEE Workshop on Appl. of Sig. Proc. to Audio and Acoust., Oct. 2001, pp. 47-50.

Daudet et al., "MDCT Analysis of Sinusoids and Applications to Coding Artifacts Reduction," Audio Eng. Soc. 114th Convention, Amsterdam, Mar. 2003, convention paper No. 5831, pp. 1-6.

Merdjani et al., "Direct Estimation of Frequency From MDCT-Encoded Files," Proc. of 6th Int. Conf on Digital Audio Effects (DAFx-03), London, Sep. 2003.

Kresch, R., et al., "Fast DCT Domain Filtering Using the DCT and the DST," IEEE Transaction on Image Processing, IEEE Inc., New York, US, vol. 8, No. 6, Jun. 1999; pp. 821-833.

Mathew, M., et al., "Modified mp3 encoder using complex modified discrete cosine transform," Multimedia and Expo. 2003, Proceedings, 2003 Int'l. Conference on Jul. 6-9, 2003, Piscataway, NJ, USA, IEEE, vol. 2, Jul. 6, 2003, pp. 709-712.

* cited by examiner

CODING TECHNIQUES USING ESTIMATED SPECTRAL MAGNITUDE AND PHASE DERIVED FROM MDCT COEFFICIENTS

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

*CROSS-REFERENCE TO RELATED APPLICATIONS; BENEFIT CLAIM*

*More than one Reissue Application has been filed for the reissue of U.S. Pat. No. 6,980,933, issued Dec. 27, 2005. The reissue applications are application Ser. Nos. 13/297,256, filed Nov. 15, 2011 (now U.S. Reissue Pat. No. Re. 44,126, Issued Apr. 2, 2013), and 11/963,680, filed Dec. 21, 2007, (now U.S. Reissue Pat. No. Re. 42,935, Issued Nov. 15, 2011). The present application claims the benefit as a Reissue Continuation Application of co-pending application Ser. No. 13/297,256, filed Nov. 15, 2011, which is a Reissue Continuation Application of application Ser. No. 11/963, 680, filed Dec. 21, 2007, now U.S. Reissue Pat. No. Re. 42,935, issued Nov. 15, 2011, which is a Reissue Application of U.S. Pat. No. 6,980,933, issued Dec. 27, 2005, the entire contents of all of the foregoing are hereby incorporated by reference as if fully set forth herein, under 35 U.S.C. § 120. Applicants hereby rescind any disclaimer of claim scope in the parent application(s) or the prosecution history thereof and advise the USPTO that the claims in this application may be broader than any claim in the parent application(s).*

TECHNICAL FIELD

The present invention provides an efficient process for accurately estimating spectral magnitude and phase from spectral information obtained from various types of analysis filter banks including those implemented by Modified Discrete Cosine Transforms and Modified Discrete Sine Transforms. These accurate estimates may be used in various signal processing applications such as audio coding and video coding.

In the following discussion more particular mention is made of audio coding applications using filter banks implemented by a particular Modified Discrete Cosine Transform; however, the present invention is also applicable to other applications and other filter bank implementations.

BACKGROUND ART

Many coding applications attempt to reduce the amount of information required to adequately represent a source signal. By reducing information capacity requirements, a signal representation can be transmitted over channels having lower bandwidth or stored on media using less space.

Coding can reduce the information capacity requirements of a source signal by eliminating either redundant components or irrelevant components in the signal. So called perceptual coding methods and systems often use filter banks to reduce redundancy by decorrelating a source signal using a basis set of spectral components, and reduce irrelevancy by adaptive quantization of the spectral components according to psycho-perceptual criteria. A coding process that adapts the quantizing resolution more coarsely can reduce information requirements to a greater extent but it also introduces higher levels of quantization error or "quantization noise" into the signal. Perceptual coding systems attempt to control the level of quantization noise so that the noise is "masked" or rendered imperceptible by other spectral content of the signal. These systems typically use perceptual models to predict the levels of quantization noise that can be masked by a given signal.

In perceptual audio coding systems, for example, quantization noise is often controlled by adapting quantizing resolutions according to predictions of audibility obtained from perceptual models based on psychoacoustic studies such as that described in E. Zwicker, Psychoacoustics, 1981. An example of a perceptual model that predicts the audibility of spectral components in a signal is discussed in M. Schroeder et al.; "Optimizing Digital Speech Coders by Exploiting Masking Properties of the Human Ear," J. Acoust. Soc. Am., December 1979, pp. 1647-1652.

Spectral components that are deemed to be irrelevant because they are predicted to be imperceptible need not be included in the encoded signal. Other spectral components that are deemed to be relevant can be quantized using a quantizing resolution that is adapted to be fine enough to ensure the quantization noise is rendered just imperceptible by other spectral components in the source signal. Accurate predictions of perceptibility by a perceptual model allow a perceptual coding system to adapt the quantizing resolution more optimally, resulting in fewer audible artifacts.

A coding system using models known to provide inaccurate predictions of perceptibility cannot reliably ensure quantization noise is rendered imperceptible unless a finer quantizing resolution is used than would otherwise be required if a more accurate prediction was available. Many perceptual models such as that discussed by Schroeder, et al. are based on spectral component magnitude; therefore, accurate predictions by these models depend on accurate measures of spectral component magnitude.

Accurate measures of spectral component magnitude also influence the performance of other types of coding processes in addition to quantization. In two types of coding processes known as spectral regeneration and coupling, an encoder reduces information requirements of source signals by excluding selected spectral components from an encoded representation of the source signals and a decoder synthesizes substitutes for the missing spectral components. In spectral regeneration, the encoder generates a representation of a baseband portion of a source signal that excludes other portions of the spectrum. The decoder synthesizes the missing portions of the spectrum using the baseband portion and side information that conveys some measure of spectral level for the missing portions, and combines the two portions to obtain an imperfect replica of the original source signal. One example of an audio coding system that uses spectral regeneration is described in international patent application no. PCT/US03/08895 filed Mar. 21, 2003, publication no. WO 03/083034 published Oct. 9, 2003. In coupling, the encoder generates a composite representation of spectral components for multiple channels of source signals and the decoder synthesizes spectral components for multiple channels using the composite representation and side information that conveys some measure of spectral level for each source signal channel. One example of an audio coding system that uses coupling is described in the Advanced Television Systems Committee (ATSC) A/52A document entitled "Revision A to Digital Audio Compression (AC-3) Standard" published Aug. 20, 2001.

The performance of these coding systems can be improved if the decoder is able to synthesize spectral components that preserve the magnitudes of the corresponding spectral components in the original source signals. The performance of coupling also can be improved if accurate measures of phase are available so that distortions caused by coupling out-of-phase signals can be avoided or compensated.

Unfortunately, some coding systems use particular types of filter banks to derive an expression of spectral components that make it difficult to obtain accurate measures of spectral component magnitude or phase. Two common types of coding systems are referred to as subband coding and transform coding. Filter banks in both subband and transform coding systems may be implemented by a variety of signal processing techniques including various time-domain to frequency-domain transforms. See J. Tribolet et al., "Frequency Domain Coding of Speech," IEEE Trans. Acoust., Speech, and Signal Proc., ASSP-27, October, 1979, pp. 512-530.

Some transforms such as the Discrete Fourier Transform (DFT) or its efficient implementation, the Fast Fourier Transform (FFT), provide a set of spectral components or transform coefficients from which spectral component magnitude and phase can be easily calculated. Spectral components of the DFT, for example, are multidimensional representations of a source signal. Specifically, the DFT, which may be used in audio coding and video coding applications, provides a set of complex-valued coefficients whose real and imaginary parts may be expressed as coordinates in a two-dimensional space. The magnitude of each spectral component provided by such a transform can be obtained easily from each component's coordinates in the multidimensional space using well known calculations.

Some transforms such as the Discrete Cosine Transform, however, provide spectral components that make it difficult to obtain an accurate measure of spectral component magnitude or phase. The spectral components of the DCT, for example, represent the spectral component of a source signal in only a subspace of the multidimensional space required to accurately convey spectral magnitude and phase. In typical audio coding and video coding applications, for example, a DCT provides a set of real-valued spectral components or transform coefficients that are expressed in a one dimensional subspace of the two-dimensional real/imaginary space mentioned above. The magnitude of each spectral component provided by transforms like the DCT cannot be obtained easily from each component's coordinates in the relevant subspace.

This characteristic of the DCT is shared by a particular Modified Discrete Cosine Transform (MDCT), which is described in J. Princen et al., "Subband/Transform Coding Using Filter Bank Designs Based on Time Domain Aliasing Cancellation," ICASSP 1987 Conf. Proc., May 1987, pp. 2161-64. The MDCT and its complementary Inverse Modified Discrete Cosine Transform (IMDCT) have gained widespread usage in many coding systems because they permit implementation of a critically sampled analysis/synthesis filter bank system that provides for perfect reconstruction of overlapping segments of a source signal. Perfect reconstruction refers to the property of an analysis/synthesis filter bank pair to reconstruct perfectly a source signal in the absence of errors caused by finite precision arithmetic. Critical sampling refers to the property of an analysis filter bank to generate a number of spectral components that is no greater than the number of samples used to convey the source signal. These properties are very attractive in many coding applications because critical sampling reduces the number of spectral components that must be encoded and conveyed in an encoded signal.

The concept of critical sampling deserves some comment. Although the DFT or the DCT, for example, generate one spectral component for each sample in a source signal segment, DFT and DCT analysis/synthesis systems in many coding applications do not provide critical sampling because the analysis transform is applied to a sequence of overlapping signal segments. The overlap allows use of non-rectangular shaped window functions that improve analysis filter bank frequency response characteristics and eliminate blocking artifacts; however, the overlap also prevents perfect reconstruction with critical sampling because the analysis filter bank must generate more coefficient values than the number of source signal samples. This loss of critical sampling increases the information requirements of the encoded signal.

As mentioned above, filter banks implemented by the MDCT and IMDCT are attractive in many coding systems because they provide perfect reconstruction of overlapping segments of a source signal with critically sampling. Unfortunately, these filter banks are similar to the DCT in that the spectral components of the MDCT represent the spectral component of a source signal in only a subspace of the multidimensional space required to accurately convey spectral magnitude and phase. Accurate measures of spectral magnitude or phase cannot be obtained easily from the spectral components or transform coefficients generated by the MDCT; therefore, the coding performance of many systems that use the MDCT filter bank is suboptimal because the prediction accuracy of perceptual models is degraded and the preservation of spectral component magnitudes by synthesizing processes is impaired.

Prior attempts to avoid this deficiency of various filter banks like the MDCT and DCT filter banks have not been satisfactory for a variety of reasons. One technique is disclosed in "ISO/IEC 11172-3: 1993 (E) Coding of Moving Pictures and Associated Audio for Digital Storage Media at Up to About 1.5 Mbit/s," ISO/IEC JTC1/SC29/WG11, Part III Audio. According to this technique, a set of filter banks including several MDCT-based filter banks is used to generate spectral components for encoding and an additional FFT-based filter bank is used to derive accurate measures of spectral component magnitude. This technique is not attractive for at least two reasons: (1) considerable computational resources are required in the encoder to implement the additional FFT filter bank needed to derive the measures of magnitude, and (2) the processing to obtain accurate measures of magnitude are performed in the encoder; therefore additional bandwidth is required by the encoded signal to convey these measures of spectral component magnitude to the decoder.

Another technique avoids incurring any additional bandwidth required to convey measures of spectral component magnitude by calculating these measures in the decoder. This is done by applying a synthesis filter bank to the decoded spectral components to recover a replica of the source signal, applying an analysis filter bank to the recovered signal to obtain a second set of spectral components in quadrature with the decoded spectral components, and calculating spectral component magnitude from the two sets of spectral components. This technique also is not attractive because considerable computational resources are required in the decoder to implement the analysis filter bank needed to obtain the second set of spectral components.

Yet another technique, described in S. Merdjani et al., "Direct Estimation of Frequency From MCT-Encoded Files," Proc. of the 6th Int. Conf. on Digital Audio Effects (DAFx-03), London, September 2003, estimates the frequency, magnitude and phase of a sinusoidal source signal from a "regularized spectrum" derived from MDCT coefficients. This technique overcomes the disadvantages mentioned above but it also is not satisfactory for typical coding applications because it is applicable only for a very simple source signal that has only one sinusoid.

Another technique, which is disclosed in U.S. patent application Ser. No. 09/948,053, publication number U.S. 2003/0093282 A1 published May 15, 2003, is able to derive DFT coefficients from MDCT coefficients; however, the disclosed technique does not obtain measures of magnitude or phase for spectral components represented by the MDCT coefficients themselves. Furthermore, the disclosed technique does not use measures of magnitude or phase to adapt processes for encoding or decoding information that represents the MDCT coefficients.

What is needed is a technique that provides accurate estimates of magnitude or phase from spectral components generated by analysis filter banks such as the MDCT that also avoids or overcomes deficiencies of known techniques.

DISCLOSURE OF INVENTION

The present invention overcomes the deficiencies of the prior art by receiving first spectral components that were generated by application of an analysis filterbank to a source signal conveying content intended for human perception, deriving one or more first intermediate components from at least some of the first spectral components, forming a combination of the one or more first intermediate components according to at least a portion of one or more impulse responses to obtain one or more second intermediate components, deriving second spectral components from the one or more second intermediate components, obtaining estimated measures of magnitude or phase using the first spectral components and the second spectral components, and applying an adaptive process to the first spectral components to generate processed information. The adaptive process adapts in response to the estimated measures of magnitude or phase.

The various features of the present invention and its preferred embodiments may be better understood by referring to the following discussion and the accompanying drawings in which like reference numerals refer to like elements in the several figures. The contents of the following discussion and the drawings are set forth as examples only and should not be understood to represent limitations upon the scope of the present invention.

MODES FOR CARRYING OUT THE INVENTION

A. Introduction

Figure 1:
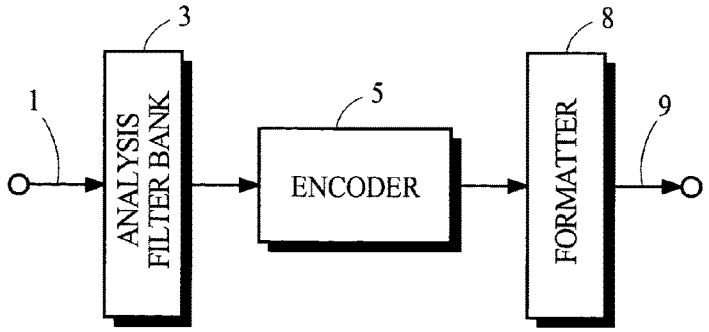
FIG. 1 is a schematic block diagram of a transmitter used in a coding system.
Figure 2:
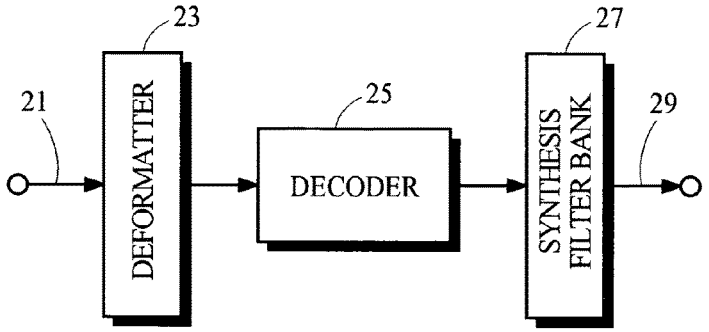
FIG. 2 is a schematic block diagram of a receiver used in a coding system.

The present invention allows accurate measures of magnitude or phase to be otained from spectral components generated by analysis filter banks such as the Modified Discrete Cosine Transform (MDCT) mentioned above. Various aspects of the present invention may be used in a number of applications including audio and video coding. FIGS. 1 and 2 illustrate schematic block diagrams of a transmitter and receiver, respectively, in a coding system that may incorporate various aspects of the present invention. Features of the illustrated transmitter and receiver are discussed briefly in the following sections. Following this discussion, features of some analysis and synthesis filter banks that are pertinent to calculating measures of magnitude and phase are discussed.

1. Transmitter

The transmitter illustrated in FIG. 1 applies the analysis filter bank 3 to a source signal received from the path 1 to generate spectral components that represent the spectral content of the source signal, applies the encoder 5 to the spectral components to generate encoded information, and applies the formatter 8 to the encoded information to generate an output signal suitable for transmission along the path 9. The output signal may be delivered immediately to a companion receiver or recorded for subsequent delivery. The analysis filter bank 3 may be implemented in variety of ways including infinite impulse response (IIR) filters, finite impulse response (FIR) filters, lattice filters and wavelet transforms.

Aspects of the present invention are described below with reference to implementations closely related to the MDCT, however, the present invention is not limited to these particular implementations.

In this disclosure, terms like "encoder" and "encoding" are not intended to imply any particular type of information processing. For example, encoding is often used to reduce information capacity requirements; however, these terms in this disclosure do not necessarily refer to this type of processing. The encoder 5 may perform essentially any type of processing that is desired. In one implementation, encoded information is generated by quantizing spectral components according to a perceptual model. In another implementation, the encoder 5 applies a coupling process to multiple channels of spectral components to generate a composite representation. In yet another implementation, spectral components for a portion of a signal bandwidth are discarded and an estimate of the spectral envelope of the discarded portion is included in the encoded information. No particular type of encoding is important to the present invention.

2. Receiver

The receiver illustrated in FIG. 2 applies the deformatter 23 to an input signal received from the path 21 to obtain encoded information, applies the decoder 25 to the encoded information to obtain spectral components representing the spectral content of a source signal, and applies the synthesis filter bank 27 to the spectral components to generate an output signal that is a replica of the source signal but may not be an exact replica. The synthesis filter bank 27 may be implemented in a variety of ways that are complementary to the implementation of the analysis filter bank 3.

In this disclosure, terms like "decoder" and "decoding" are not intended to imply any particular type of information processing. The decoder 25 may perform essentially any type of processing that is needed or desired. In one implementation that is inverse to an encoding process described above, quantized spectral components are decoded into dequantized spectral components. In another implementation, multiple channels of spectral components are synthesized from a composite representation of spectral components. In yet another implementation, the decoder 25 synthesizes missing portions of a signal bandwidth from spectral envelope information. No particular type of decoding is important to the present invention.

3. Measures of Magnitude and Phase

In one implementation by an Odd Discrete Fourier Transform (ODFT), the analysis filter bank 3 generates complex-valued coefficients or "spectral components" with real and imaginary parts that may be expressed in a two-dimensional space. This transform may be expressed as:

$$X_{ODFT}(k) = \sum_{n=0}^{N-1} x(n) \cdot \exp\left[-j\frac{2\pi}{N}\left(k+\frac{1}{2}\right)(n+n_0)\right] \tag{1}$$

which may be separated into real and imaginary parts $$X_{ODFT}(k)=\mathrm{Re}[X_{ODFT}(k)]+j\cdot\mathrm{Im}[X_{ODFT}(k)] \tag{2}$$

and rewritten as $$X_{ODFT}(k) = \sum_{n=0}^{N-1} x(n) \cdot \cos\left[\frac{2\pi}{N}\left(k+\frac{1}{2}\right)(n+n_0)\right] - j\cdot\sum_{n=0}^{N-1} x(n) \cdot \sin\left[\frac{2\pi}{N}\left(k+\frac{1}{2}\right)(n+n_0)\right] \tag{3}$$

where $X_{ODFT}(k)$=ODFT coefficient for spectral component k, x(n)=source signal amplitude at time n;

Re[X]=real part of X; and

Im[X]=imaginary part of X.

The magnitude and phase of each spectral component k may be calculated as follows:

$$\mathrm{Mag}[X_{ODFT}(k)] = |X_{ODFT}(k)| = \sqrt{\mathrm{Re}[X_{ODFT}(k)]^2 + \mathrm{Im}[X_{ODFT}(k)]^2} \tag{4}$$

$$\mathrm{Phs}[X_{ODFT}(k)] = \arctan\left[\frac{\mathrm{Im}[X_{ODFT}(k)]}{\mathrm{Re}[X_{ODFT}(k)]}\right] \tag{5}$$

where Mag[X]=magnitude of X; and

Phs[X]=phase of X.

Many coding applications implement the analysis filter bank 3 by applying the Modified Discrete Cosine Transform (MDCT) discussed above to overlapping segments of the source signal that are modulated by an analysis window function. This transform may be expressed as:

$$X_{MDCT}(k) = \sum_{n=0}^{N-1} x(n) \cdot \cos\left[\frac{2\pi}{N}\left(k+\frac{1}{2}\right)(n+n_0)\right] \tag{6}$$

where $X_{MDCT}(k)$=MDCT coefficient for spectral component k. It may be seen that the spectral components that are generated by the MDCT are equivalent to the real part of the ODFT coefficients.

$$X_{MDCT}(k)=\mathrm{Re}[X_{ODFT}(k)] \tag{7}$$

A particular Modified Discrete Sine Transform (MDST) that generates coefficients representing spectral components in quadrature with the spectral components represented by coefficients of the MDCT may be expressed as:

$$X_{MDST}(k) = \sum_{n=0}^{N-1} x(n) \cdot \sin\left[\frac{2\pi}{N}\left(k+\frac{1}{2}\right)(n+n_0)\right] \tag{8}$$

where $X_{MDST}(k)$=MDST coefficient for spectral component k. It may be seen that the spectral components that are generated by the MDST are equivalent to the negative imaginary part of the ODFT coefficients.

$$X_{MDST}(k)=-\mathrm{Im}[X_{ODFT}(k)] \tag{9}$$

Accurate measures of magnitude and phase cannot be calculated directly from MDCT coefficients but they can be calculated directly from a combination of MDCT and MDST coefficients, which can be seen by substituting equations 7 and 9 into equations 4 and 5:

$$\mathrm{Mag}[X_{ODFT}(k)]=\sqrt{X_{MDCT}^2(k)+X_{MDST}^2(k)}$$

$$\mathrm{Phs}[X_{ODFT}(k)] = \arctan\left[\frac{-X_{MDST}(k)}{X_{MDCT}(k)}\right] \tag{11}$$

The Princen paper mentioned above indicates that a correct use of the MDCT requires the application of an analysis window function that satisfies certain design criteria. The expressions of transform equations in this section of the disclosure omit an explicit reference to any analysis window function, which implies a rectangular analysis window function that does not satisfy these criteria. This does not affect the validity of expressions 10 and 11.

Implementations of the present invention described below obtain measures of spectral component magnitude and phase from MDCT coefficients and from MDST coefficients derived from the MDCT coefficients. These implementations are described below following a discussion of the underlying mathematical basis.

B. Derivation of Mathematical Framework

This section discusses the derivation of an analytical expression for calculating exact MDST coefficients from MDCT coefficients. This expression is shown below in equations 41a and 41b. The derivations of simpler analytical expressions for two specific window functions are also discussed. Considerations for practical implementations are presented following a discussion of the derivations.

One implementation of the present invention discussed below is derived from a process for calculating exact MDST coefficients from MDCT coefficients. This process is equivalent to another process that applies an Inverse Modified Discrete Cosine Transform (IMDCT) synthesis filter bank to blocks of MDCT coefficients to generate windowed segments of time-domain samples, overlap-adds the windowed segments of samples to reconstruct a replica of the original source signal, and applies an MDST analysis filter bank to a segment of the recovered signal to generate the MDST coefficients.

1. Arbitrary Window Function

Exact MDST coefficients cannot be calculated from a single segment of windowed samples that is recovered by applying the IMDCT synthesis filter bank to a single block of MDCT coefficients because the segment is modulated by an analysis window function and because the recovered samples contain time-domain aliasing. The exact MDST coefficients can be computed only with the additional knowledge of the MDCT coefficients for the preceding and subsequent segments. For example, in the case where the segments overlap one another by one-half the segment length, the effects of windowing and the time-domain aliasing for a given segment II can be canceled by applying the synthesis filter bank and associated synthesis window function to three blocks of MDCT coefficients representing three consecutive overlapping segments of the source signal, denoted as segment I, segment II and segment III. Each segment overlaps an adjacent segment by an amount equal to one-half of the segment length. Windowing effects and time-domain aliasing in the first half of segment II are canceled by an overlap-add with the second half of segment I, and these effects in the second half of segment II are canceled by an overlap-add with the first half of segment III.

The expression that calculates MDST coefficients from MDCT coefficients depends on the number of segments of the source signal, the overlap structure and length of these segments, and the choice of the analysis and synthesis window functions. None of these features are important in principle to the present invention. For ease of illustration, however, it is assumed in the examples discussed below that the three segments have the same length N, which is even, and overlap one another by an amount equal to one-half the segment length, that the analysis and synthesis window functions are identical to one another, that the same window functions are applied to all segments of the source signal, and that the window functions are such that their overlap-add properties satisfy the following criterion, which is required for perfect reconstruction of the source signal as explained in the Princen paper.

$$w(r)^2 + w\left(r + \frac{N}{2}\right)^2 = 1 \text{ for } r \in \left[0, \frac{N}{2} - 1\right]$$

where w(r)=analysis and synthesis window function; and

N=length of each source signal segment.

The MDCT coefficients $X_i$ for the source signal x(n) in each of the segments i may be expressed as:

$$X_I(p) = \sum_{n=0}^{N-1} w(n)x(n)\cos\left(\frac{2\pi}{N}\left(p + \frac{1}{2}\right)(n + n_0)\right) \tag{12}$$

$$X_{II}(p) = \sum_{n=0}^{N-1} w(n)x\left(n + \frac{N}{2}\right)\cos\left(\frac{2\pi}{N}\left(p + \frac{1}{2}\right)(n + n_0)\right) \tag{13}$$

$$X_{III}(p) = \sum_{n=0}^{N-1} w(n)x(n + N)\cos\left(\frac{2\pi}{N}\left(p + \frac{1}{2}\right)(n + n_0)\right) \tag{14}$$

The windowed time-domain samples $\hat{x}$ that are obtained from an application of the IMDCT synthesis filter bank to each block of MDCT coefficients may be expressed as:

$$\hat{x}_I(r) = \frac{2\,w(r)}{N}\sum_{p=0}^{N-1} X_I(p)\cos\left(\frac{2\pi}{N}\left(p + \frac{1}{2}\right)(r + n_0)\right) \tag{15}$$

$$\hat{x}_{II}(r) = \frac{2\,w(r)}{N}\sum_{p=0}^{N-1} X_{II}(p)\cos\left(\frac{2\pi}{N}\left(p + \frac{1}{2}\right)(r + n_0)\right) \tag{16}$$

$$\hat{x}_{III}(r) = \frac{2\,w(r)}{N}\sum_{p=0}^{N-1} X_{III}(p)\cos\left(\frac{2\pi}{N}\left(p + \frac{1}{2}\right)(r + n_0)\right) \tag{17}$$

Samples s(r) of the source signal for segment II are reconstructed by overlapping and adding the three windowed segments as described above, thereby removing the time-domain aliasing from the source signal x. This may be expressed as:

$$s(r) = \begin{cases} \hat{x}_I\left(r + \frac{N}{2}\right) + \hat{x}_{II}(r) & \text{for } r \in \left[0, \frac{N}{2} - 1\right] \\ \hat{x}_{II}(r) + \hat{x}_{III}\left(r - \frac{N}{2}\right) & \text{for } r \in \left[\frac{N}{2}, N - 1\right] \end{cases} \tag{18}$$

A block of MDST coefficients S(k) may be calculated for segment II by applying an MDST analysis filter bank to the time-domain samples in the reconstructed segment II, which may be expressed as:

$$S(k) = \sum_{r=0}^{N-1} w(r)s(r)\sin\left(\frac{2\pi}{N}\left(k + \frac{1}{2}\right)(r + n_0)\right) \tag{19}$$

Using expression 18 to substitute for s(r), expression 19 can be rewritten as:

$$S(k) = \sum_{r=0}^{\frac{N}{2}-1} w(r)\left[\hat{x}_I\left(r+\frac{N}{2}\right)+\hat{x}_{II}(r)\right]\sin\left(\frac{2\pi}{N}\left(k+\frac{1}{2}\right)(r+n_0)\right) + \sum_{r=\frac{N}{2}}^{N-1} w(r)\left[\hat{x}_{II}(r)+\hat{x}_{III}\left(r-\frac{N}{2}\right)\right]\sin\left(\frac{2\pi}{N}\left(k+\frac{1}{2}\right)(r+n_0)\right) \tag{20}$$

This equation can be rewritten in terms of the MDCT coefficients by using expressions 15-17 to substitute for the time-domain samples:

$$\begin{aligned} S(k) = {} & \sum_{r=0}^{\frac{N}{2}-1} w(r)\left(\frac{w\left(r+\frac{N}{2}\right)}{N}\sum_{p=0}^{N-1} X_I(p)\cos\left(\frac{2\pi}{N}\left(p+\frac{1}{2}\right)(r+n_0)\right)\right) \\ & \sin\left(\frac{2\pi}{N}\left(k+\frac{1}{2}\right)(r+n_0)\right) + \\ & \sum_{r=0}^{\frac{N}{2}-1} w(r)\left(\frac{w(r)}{N}\sum_{p=0}^{N-1} X_{II}(p)\cos\left(\frac{2\pi}{N}\left(p+\frac{1}{2}\right)(r+n_0)\right)\right) \\ & \sin\left(\frac{2\pi}{N}\left(k+\frac{1}{2}\right)(r+n_0)\right) + \\ & \sum_{r=\frac{N}{2}}^{N-1} w(r)\left(\frac{w(r)}{N}\sum_{p=0}^{N-1} X_{II}(p)\cos\left(\frac{2\pi}{N}\left(p+\frac{1}{2}\right)(r+n_0)\right)\right) \\ & \sin\left(\frac{2\pi}{N}\left(k+\frac{1}{2}\right)(r+n_0)\right) + \\ & \sum_{r=\frac{N}{2}}^{N-1} w(r)\left(\frac{w\left(r-\frac{N}{2}\right)}{N}\sum_{p=0}^{N-1} X_{III}(p)\cos\left(\frac{2\pi}{N}\left(p+\frac{1}{2}\right)(r+n_0)\right)\right) \\ & \sin\left(\frac{2\pi}{N}\left(k+\frac{1}{2}\right)(r+n_0)\right) \end{aligned} \tag{21}$$

The remainder of this section of the disclosure shows how this equation can be simplified as shown below in equations 41a and 41b.

Using the trigonometric identity $\sin\alpha\cdot\cos\beta=\frac{1}{2}[\sin(\alpha+\beta)+\sin(\alpha-\beta)]$ to gather terms and switching the order of summation, expression 21 can be rewritten as $$\begin{aligned} S(k) = {} & \\ & \frac{1}{N}\sum_{p=0}^{N-1} X_I(p)\sum_{r=0}^{\frac{N}{2}-1} w(r)w\left(r+\frac{N}{2}\right)\cdot\sin\left[\frac{2\pi}{N}\left(k+\frac{1}{2}\right)(r+n_0)+\frac{2\pi}{N}\left(p+\frac{1}{2}\right)\right. \\ & \left.(r+n_0)+\frac{2\pi}{N}\left(p+\frac{1}{2}\right)\left(\frac{N}{2}\right)\right]+ \\ & \frac{1}{N}\sum_{p=0}^{N-1} X_I(p)\sum_{r=0}^{\frac{N}{2}-1} w(r)w\left(r+\frac{N}{2}\right)\cdot\sin\left[\frac{2\pi}{N}\left(k+\frac{1}{2}\right)(r+n_0)-\right. \\ & \left.\frac{2\pi}{N}\left(p+\frac{1}{2}\right)(r+n_0)-\frac{2\pi}{N}\left(p+\frac{1}{2}\right)\left(\frac{N}{2}\right)\right]+ \end{aligned} \tag{22}$$

-continued $$\begin{aligned} & \frac{1}{N}\sum_{p=0}^{N-1} X_{II}(p)\sum_{r=0}^{\frac{N}{2}-1} w(r)w(r)\sin\left[\frac{2\pi}{N}(k+p+1)(r+n_0)\right]+ \\ & \frac{1}{N}\sum_{p=0}^{N-1} X_{II}(p)\sum_{r=0}^{\frac{N}{2}-1} w(r)w(r)\sin\left[\frac{2\pi}{N}(k-p+1)(r+n_0)\right]+ \\ & \frac{1}{N}\sum_{p=0}^{N-1} X_{II}(p)\sum_{r=\frac{N}{2}}^{N-1} w(r)w(r)\sin\left[\frac{2\pi}{N}(k+p+1)(r+n_0)\right]+ \\ & \frac{1}{N}\sum_{p=0}^{N-1} X_{II}(p)\sum_{r=\frac{N}{2}}^{N-1} w(r)w(r)\sin\left[\frac{2\pi}{N}(k-p)(r+n_0)\right]+ \\ & \frac{1}{N}\sum_{p=0}^{N-1} X_{III}(p)\sum_{r=\frac{N}{2}}^{N-1} w(r)w\left(r-\frac{N}{2}\right)\cdot\sin\left[\frac{2\pi}{N}\left(k+\frac{1}{2}\right)(r+n_0)+\right. \\ & \left.\frac{2\pi}{N}\left(p+\frac{1}{2}\right)(r+n_0)-\frac{2\pi}{N}\left(p+\frac{1}{2}\right)\left(\frac{N}{2}\right)\right]+ \\ & \frac{1}{N}\sum_{p=0}^{N-1} X_{III}(p)\sum_{r=\frac{N}{2}}^{N-1} w(r)w\left(r-\frac{N}{2}\right)\cdot\sin\left[\frac{2\pi}{N}\left(k+\frac{1}{2}\right)(r+n_0)-\right. \\ & \left.\frac{2\pi}{N}\left(p+\frac{1}{2}\right)(r+n_0)+\frac{2\pi}{N}\left(p+\frac{1}{2}\right)\left(\frac{N}{2}\right)\right] \end{aligned}$$

This expression can be simplified by combining pairs of terms that are equal to each other. The first and second terms are equal to each other. The third and fourth terms are equal to each other. The fifth and sixth terms are equal to each other and the seventh and eighth terms are equal to each other. The equality between the third and fourth terms, for example, may be shown by proving the following lemma:

$$\frac{1}{N}\sum_{p=0}^{N-1} X_{II}(p)\sum_{r=0}^{\frac{N}{2}-1} w(r)w(r)\sin\left[\frac{2\pi}{N}(k+p+1)(r+n_0)\right] = \frac{1}{N}\sum_{p=0}^{N-1} X_{II}(p)\sum_{r=0}^{\frac{N}{2}-1} w(r)w(r)\sin\left[\frac{2\pi}{N}(k-p)(r+n_0)\right] \tag{23}$$

This lemma may be proven by rewriting the left-hand and right-hand sides of equation 23 as functions of p as follows:

$$\frac{1}{N}\sum_{p=0}^{N-1} X_{II}(p)\sum_{r=0}^{\frac{N}{2}-1} w(r)w(r)\sin\left[\frac{2\pi}{N}(k+p+1)(r+n_0)\right] = \frac{1}{N}\sum_{p=0}^{N-1} F(p) \tag{24a}$$

$$\frac{1}{N}\sum_{p=0}^{N-1} X_{II}(p)\sum_{r=0}^{\frac{N}{2}-1} w(r)w(r)\sin\left[\frac{2\pi}{N}(k-p)(r+n_0)\right] = \frac{1}{N}\sum_{p=0}^{N-1} G(p) \tag{24b}$$

where $$F(p) = X_{II}(p)\sum_{r=0}^{\frac{N}{2}-1} w(r)w(r)\sin\left[\frac{2\pi}{N}(k+p+1)(r+n_0)\right] \tag{25a}$$

$$G(p) = X_{II}(p)\sum_{r=0}^{\frac{N}{2}-1} w(r)w(r)\sin\left[\frac{2\pi}{N}(k-p)(r+n_0)\right] \tag{25b}$$

The expression of G as a function of (p) can be rewritten as a function of (N−1−p) as follows:

$$G(N-1-p) = X_{II}(N-1-p)\sum_{r=0}^{\frac{N}{2}-1} w(r)w(r)\sin\left[\frac{2\pi}{N}(k-(N-1-p))(r+n_0)\right] \tag{26}$$

It is known that MDCT coefficients are odd symmetric; therefore, $X_{II}(N-1-p)=-X_{II}(p)$ for $$p \in \left[0, \frac{N}{2}-1\right].$$

By rewriting (k−(N−1−p)) as (k+1+p)−N, it may be seen that $(k-(N-1-p))\cdot(r+n_0)=(k+1+p)\cdot(r+n_0)-N\cdot(r+n_0)$. These two equalities allow expression 26 to be rewritten as:

$$G(N-1-p) = -X_{II}(p)\sum_{r=0}^{\frac{N}{2}-1} w(r)w(r)\sin\left[\frac{2\pi}{N}(k+p+1)(r+n_0)-2\pi(r+n_0)\right] \tag{27}$$

Referring to the Princen paper, the value for $n_0$ is ½(N/2+1), which is mid-way between two integers. Because r is an integer, it can be seen that the final term 27$\pi(r+n_0)$ in the summand of expression 27 is equal to an odd integer multiple of π; therefore, expression 27 can be rewritten as $$G(N-1-p) = +X_{II}(p)\sum_{r=0}^{\frac{N}{2}-1} w(r)w(r)\sin\left[\frac{2\pi}{N}(k+p+1)(r+n_0)\right] = F(p) \tag{28}$$

which proves the lemma shown in equation 23. The equality between the other pairs of terms in equation 22 can be shown in a similar manner.

By omitting the first, third, fifth and seventh terms in expression 22 and doubling the second, fourth, sixth and eighth terms, equation 22 can be rewritten as follows after simplifying the second and eighth terms:

$$\begin{aligned} S(k) = {} & \frac{2}{N}\sum_{p=0}^{N-1} X_I(p) \sum_{r=0}^{\frac{N}{2}-1} w(r)w\left(r+\frac{N}{2}\right)\sin\left[\frac{2\pi}{N}(k-p)(r+n_0)-\pi p-\frac{\pi}{2}\right] + \\ & \frac{2}{N}\sum_{p=0}^{N-1} X_{II}(p)\sum_{r=0}^{\frac{N}{2}-1} w(r)w(r)\sin\left[\frac{2\pi}{N}(k-p)(r+n_0)\right] + \\ & \frac{2}{N}\sum_{p=0}^{N-1} X_{II}(p)\sum_{r=\frac{N}{2}}^{N-1} w(r)w(r)\sin\left[\frac{2\pi}{N}(k-p)(r+n_0)\right] + \\ & \frac{2}{N}\sum_{p=0}^{N-1} X_{III}(p) \sum_{r=\frac{N}{2}}^{N-1} w(r)w\left(r-\frac{N}{2}\right)\sin\left[\frac{2\pi}{N}(k-p)(r+n_0)+\pi p+\frac{\pi}{2}\right] \end{aligned} \tag{29}$$

Using the following identities:

$$\begin{aligned} \sin(\alpha \pm \pi p) &= (-1)^p \sin\alpha \\ \sin\left(\alpha+\frac{\pi}{2}\right) &= +\cos\alpha \\ \sin\left(\alpha-\frac{\pi}{2}\right) &= -\cos\alpha \end{aligned} \tag{30}$$

expression 29 can be rewritten as:

$$\begin{aligned} S(k) = {} & \frac{2}{N}\sum_{p=0}^{N-1} (-1)^{p+1} X_I(p) \sum_{r=0}^{\frac{N}{2}-1} w(r)w\left(r+\frac{N}{2}\right)\cos\left[\frac{2\pi}{N}(k-p)(r+n_0)\right] + \\ & \frac{2}{N}\sum_{p=0}^{N-1} X_{II}(p)\sum_{r=0}^{\frac{N}{2}-1} w(r)w(r)\sin\left[\frac{2\pi}{N}(k-p)(r+n_0)\right] + \\ & \frac{2}{N}\sum_{p=0}^{N-1} X_{II}(p)\sum_{r=\frac{N}{2}}^{N-1} w(r)w(r)\sin\left[\frac{2\pi}{N}(k-p)(r+n_0)\right] + \\ & \frac{2}{N}\sum_{p=0}^{N-1} (-1)^p X_{III}(p) \sum_{r=\frac{N}{2}}^{N-1} w(r)w\left(r-\frac{N}{2}\right)\cos\left[\frac{2\pi}{N}(k-p)(r+n_0)\right] \end{aligned} \tag{31}$$

The inner summations of the third and fourth terms are changed so that their limits of summation are from r=0 to r=(N/2−1) by making the following substitutions:

$$\sin\left(\frac{2\pi}{N}(k-p)\left(r+n_0+\frac{N}{2}\right)\right) = (-1)^{k-p}\sin\left(\frac{2\pi}{N}(k-p)(r+n_0)\right)$$

$$\cos\left(\frac{2\pi}{N}(k-p)\left(r+n_0+\frac{N}{2}\right)\right) = (-1)^{k-p}\cos\left(\frac{2\pi}{N}(k-p)(r+n_0)\right)$$

This allows equation 31 to be rewritten as $$S(k) = \frac{2}{N}\sum_{p=0}^{N-1}(-1)^{p+1}X_I(p)\sum_{r=0}^{\frac{N}{2}-1}w(r)w\left(r+\frac{N}{2}\right)\cos\left[\frac{2\pi}{N}(k-p)(r+n_0)\right] + \frac{2}{N}\sum_{p=0}^{N-1}X_{II}(p)\sum_{r=0}^{\frac{N}{2}-1}w(r)w(r)\sin\left[\frac{2\pi}{N}(k-p)(r+n_0)\right] + \frac{2}{N}\sum_{p=0}^{N-1}(-1)^{(k-p)}X_{II}(p)\sum_{r=0}^{\frac{N}{2}-1}w\left(r+\frac{N}{2}\right)w\left(r+\frac{N}{2}\right)\sin\left[\frac{2\pi}{N}(k-p)(r+n_0)\right] + \frac{2}{N}\sum_{p=0}^{N-1}(-1)^{p}(-1)^{(k-p)}X_{III}(p)\sum_{r=0}^{\frac{N}{2}-1}w\left(r+\frac{N}{2}\right)w(r)\cos\left[\frac{2\pi}{N}(k-p)(r+n_0)\right] \tag{32}$$

Equation 32 can be simplified by using the restriction imposed on the window function mentioned above that is required for perfect reconstruction of the source signal. This restriction is $w(r)^2+w(r+N/2)^2=1$. With this restriction, equation 31 can be simplified to $$S(k) = \frac{2}{N}\sum_{p=0}^{N-1}[(-1)^{p+1}X_I(p) + (-1)^k X_{III}(p)]\cdot \sum_{r=0}^{\frac{N}{2}-1}w(r)w\left(r+\frac{N}{2}\right)\cos\left[\frac{2\pi}{N}(k-p)(r+n_0)\right] + \frac{2}{N}\sum_{p=0}^{N-1}X_{II}(p)\sum_{r=0}^{\frac{N}{2}-1}w(r)\sin\left[\frac{2\pi}{N}(k-p)(r+n_0)\right] + \frac{2}{N}\sum_{p=0}^{N-1}(-1)^{(k-p)}X_{II}(p)\sum_{r=0}^{\frac{N}{2}-1}(1-w^2(r))\sin\left[\frac{2\pi}{N}(k-p)(r+n_0)\right] \tag{33}$$

Gathering terms, equation 33 can be rewritten as $$S(k) = \frac{2}{N}\sum_{p=0}^{N-1}[(-1)^{p+1}X_I(p) + (-1)^k X_{III}(p)]\cdot \sum_{r=0}^{\frac{N}{2}-1}w(r)w\left(r+\frac{N}{2}\right)\cos\left[\frac{2\pi}{N}(k-p)(r+n_0)\right] + \frac{2}{N}\sum_{p=0}^{N-1}[X_{II}(p) - (-1)^{(k-p)}X_{II}(p)] \tag{34}$$

-continued $$\sum_{r=0}^{\frac{N}{2}-1}w^2(r)\sin\left[\frac{2\pi}{N}(k-p)(r+n_0)\right] + \frac{2}{N}\sum_{p=0}^{N-1}(-1)^{(k-p)}X_{II}(p)\sum_{r=0}^{\frac{N}{2}-1}\sin\left[\frac{2\pi}{N}(k-p)(r+n_0)\right]$$

Equation 34 can be simplified by recognizing the inner summation of the third term is equal to zero. This can be shown by proving two lemmas. One lemma postulates the following equality:

$$I_{\alpha,q}(r) = \sum_{r=0}^{\frac{N}{2}-1}\sin\left(\frac{2\pi}{N}(q)(r+\alpha)\right) = \sin\left(\frac{2\pi q\alpha}{N} + \frac{\pi q}{2} - \frac{\pi q}{N}\right)\frac{\sin\frac{\pi q}{2}}{\sin\frac{\pi q}{N}} \tag{35}$$

This equality may be proven by rewriting the summand into exponential form, rearranging, simplifying and combining terms as follows:

$$\begin{aligned} I_{\alpha,q}(r) &= \sum_{r=0}^{\frac{N}{2}-1}\frac{1}{2i}\left[\exp\left(+j\frac{2\pi q}{N}(r+a)\right) - \exp\left(-j\frac{2\pi q}{N}(r+a)\right)\right] \\ &= \frac{1}{2i}\exp\left(+j\frac{2\pi qa}{N}\right)\sum_{r=0}^{\frac{N}{2}-1}\exp\left(+j\frac{2\pi qr}{N}\right) - \frac{1}{2i}\exp\left(-j\frac{2\pi qa}{N}\right)\sum_{r=0}^{\frac{N}{2}-1}\exp\left(-j\frac{2\pi qr}{N}\right) \\ &= \frac{1}{2i}\exp\left(+j\frac{2\pi qa}{N}\right)\left[\frac{1-\exp\left(+j\frac{2\pi q}{N}\frac{N}{2}\right)}{1-\exp\left(+j\frac{2\pi q}{N}\right)}\right] - \frac{1}{2i}\exp\left(-j\frac{2\pi qa}{N}\right)\left[\frac{1-\exp\left(-j\frac{2\pi q}{N}\frac{N}{2}\right)}{1-\exp\left(-j\frac{2\pi q}{N}\right)}\right] \\ &= \frac{1}{2i}\exp\left(+j\frac{2\pi qa}{N}\right)\frac{\exp\left(+j\frac{\pi q}{2}\right)}{\exp\left(+j\frac{\pi q}{N}\right)}\left[\frac{\exp\left(-j\frac{\pi q}{2}\right)-\exp\left(+j\frac{\pi q}{2}\right)}{\exp\left(-j\frac{\pi q}{2}\right)-\exp\left(+j\frac{\pi q}{2}\right)}\right] - \frac{1}{2i}\exp\left(-j\frac{2\pi qa}{N}\right)\frac{\exp\left(-j\frac{\pi q}{2}\right)}{\exp\left(-j\frac{\pi q}{N}\right)}\left[\frac{\exp\left(+j\frac{\pi q}{2}\right)-\exp\left(-j\frac{\pi q}{2}\right)}{\exp\left(+j\frac{\pi q}{N}\right)-\exp\left(-j\frac{\pi q}{2}\right)}\right] \\ &= \frac{1}{2i}\exp\left(+j\frac{2\pi qa}{N} + j\frac{2\pi q}{2} - j\frac{2\pi q}{2}\right)\frac{\sin\frac{\pi q}{2}}{\sin\frac{\pi q}{N}} \\ &\quad \frac{1}{2i}\exp\left(-j\frac{2\pi qa}{N} - j\frac{2\pi q}{2} + j\frac{2\pi q}{N}\right)\frac{\sin\frac{\pi q}{2}}{\sin\frac{\pi q}{N}} \end{aligned} \tag{36}$$

$$I_{q,a}(r) = \sin\left(\frac{2\pi qa}{N} + \frac{\pi q}{2} - \frac{\pi q}{N}\right)\frac{\sin\frac{\pi q}{2}}{\sin\frac{\pi q}{N}}$$

$$\sum_{r=0}^{\frac{N}{2}-1} \sin\left[\frac{2\pi}{N}(k-p)(r+n_0)\right] = 0 \text{ for } n_0 = \frac{1}{2}\left(\frac{N}{2}+1\right).$$

This may be proven by substituting $n_0$ for a in expression 35 to obtain the following:

$$\begin{aligned} I_{n_0,q}(r) &= \sin\left(\frac{2\pi q\left(\frac{N}{2}+1\right)}{N} + \frac{\pi q}{2} - \frac{\pi q}{N}\right)\frac{\sin\frac{\pi q}{2}}{\sin\frac{\pi q}{N}} \\ &= \sin\left(\frac{\pi q}{N}\left(\frac{N}{2}+1\right) + \frac{\pi q}{2} - \frac{\pi q}{N}\right)\frac{\sin\frac{\pi q}{2}}{\sin\frac{\pi q}{N}} \\ &= \left(\frac{\pi q}{2} + \frac{\pi q}{N} + \frac{\pi q}{2} - \frac{\pi q}{N}\right)\frac{\sin\frac{\pi q}{2}}{\sin\frac{\pi q}{N}} \\ &= \sin(\pi q)\frac{\sin\frac{\pi q}{2}}{\sin\frac{\pi q}{N}} = 0, \text{ for q, an integer.} \end{aligned} \tag{37}$$

By substituting (k−p) for q in expression 35 and using the preceding two lemmas, the inner summation of the third term in equation 34 may be shown to equal zero as follows:

$$\sum_{r=0}^{\frac{N}{2}-1} \sin\left[\frac{2\pi}{N}q(r+n_0)\right] = \sum_{r=0}^{\frac{N}{2}-1} \sin\left[\frac{2\pi}{N}(k-p)(r+n_0)\right] = 0$$

$$\text{for } n_0 = \frac{1}{2}\left(\frac{N}{2}+1\right).$$

Using this equality, equation 34 may be simplified to the following:

$$\begin{aligned} S(k) = \frac{2}{N}\sum_{p=0}^{N-1} & [(-1)^{p+1}X_I(p) + (-1)^k X_{III}(p)] \cdot \\ & \sum_{r=0}^{\frac{N}{2}-1} w(r)w\left(r+\frac{N}{2}\right)\cos\left[\frac{2\pi}{N}(k-p)(r+n_0)\right] + \frac{2}{N} \\ & \sum_{p=0}^{N-1} [[1-(-1)^{(k-p)}]X_{II}(p)]\sum_{r=0}^{\frac{N}{2}-1} w^2(r)\sin\left[\frac{2\pi}{N}(k-p)(r+n_0)\right] \end{aligned} \tag{38}$$

The MDST coefficients S(k) of a real-valued signal are symmetric according to the expression S(k)=S(N−1−k), for k∈[0, N−1]. Using this property, all even numbered coefficients can be expressed as S(2v)=S(N−1−2v)=S(N−2(v+1)+1), for $$v \in \left[0, \frac{N}{2}-1\right].$$

Because N and 2(v+1) are both even numbers, the quantity (N−2(v+1)+1) is an odd number. From this, it can be seen the even numbered coefficients can be expressed in terms of the odd numbered coefficients. Using this property of the coefficients, equation 38 can be rewritten as follows:

$$\begin{aligned} S(2v) = \frac{2}{N}\sum_{p=0}^{N-1} & [(-1)^{p+1}X_I(p) + X_{III}(p)] \cdot \\ & \sum_{r=0}^{\frac{N}{2}-1} w(r)w\left(r+\frac{N}{2}\right)\cos\left[\frac{2\pi}{N}(2v-p)(r+n_0)\right] + \\ & \frac{2}{N}\sum_{p=0}^{N-1} [(1-(-1)^{-p})X_{II}(p)]\sum_{r=0}^{\frac{N}{2}-1} w^2(r)\sin\left[\frac{2\pi}{N}(2v-p)(r+n_0)\right] \end{aligned} \tag{39}$$

$$\text{where } k = 2v,\ v \in \left[0, \frac{N}{2}-1\right]$$

The second term in this equation is equal to zero for all even values of p. The second term needs to be evaluated only for odd values of p, or for p=2l+1 for $$l \in \left[0, \frac{N}{2}-1\right].$$

$$\begin{aligned} S(2v) = \frac{2}{N}\sum_{p=0}^{N-1} & [(-1)^{p+1}X_I(p) + X_{III}(p)] \cdot \\ & \sum_{r=0}^{\frac{N}{2}-1} w(r)w\left(r+\frac{N}{2}\right)\cos\left[\frac{2\pi}{N}(2v-p)(r+n_0)\right] + \\ & \frac{4}{N}\sum_{l=0}^{\frac{N}{2}-1} X_{II}(2l+1)\sum_{r=0}^{\frac{N}{2}-1} w^2(r)\sin\left[\frac{2\pi}{N}(2v-(2l+1))(r+n_0)\right] \end{aligned} \tag{40}$$

$$\text{where } v \in \left[0, \frac{N}{2}-1\right]$$

Equation 40 can be rewritten as a summation of two modified convolution operations of two functions $h_{I,III}$ and $h_{II}$ with two sets of intermediate spectral components $m_{I,III}$ and $m_{II}$ that are derived from the MDCT coefficients $X_I$, $X_{II}$, and XIII for three segments of the source signal as follows:

$$S(2v) = \frac{2}{N}\sum_{p=0}^{N-1} m_{I,III}(p)h_{I,III}(2v-p) + \frac{4}{N}\sum_{l=0}^{\frac{N}{2}-1} m_{II}(2l+1)h_{II}(2v-(2l+1)), \tag{41a}$$

where $$m_{I,III}(\tau) = [(-1)^{\tau+1}X_I(\tau) + X_{III}(\tau)]$$

$$m_{II}(\tau) = X_{II}(\tau)$$

$$h_{I,III}(\tau) = \sum_{r=0}^{\frac{N}{2}-1} \omega(r)\omega\left(r+\frac{N}{2}\right)\cos\left[\frac{2\pi}{N}(\tau)(r+n_0)\right],$$

$$h_{II}(\tau) = \sum_{r=0}^{\frac{N}{2}-1} \omega^2(r)\sin\left[\frac{2\pi}{N}(\tau)(r+n_0)\right],$$

$$v \in \left[0, \frac{N}{2}-1\right],$$

$$S(2v+1) = S(N-2(1+v)) \tag{41b}$$

The results of the modified convolution operations depend on the properties of the functions $h_{I,III}$ and $h_{II}$, which are impulse responses of hypothetical filters that are related to the combined effects of the IMDCT synthesis filter bank, the subsequent MDST analysis filter bank, and the analysis and synthesis window functions The modified convolutions need to be evaluated only for even integers.

Each of the impulse responses is symmetric. It may be seen from inspection that $h_{I,III}(\tau)=h_{I,III}(-\tau)$ and $h_{II}(\tau)=-h_{II}(-\tau)$. These symmetry properties may be exploited in practical digital implementations to reduce the amount of memory needed to store a representation of each impulse response. An understanding of how the symmetry properties of the impulse responses interact with the symmetry properties of the intermediate spectral components $m_{I,III}$ and $m_{II}$ may also be exploited in practical implementations to reduce computational complexity.

The impulse responses $h_{I,III}(\tau)$ and $h_{II}(\tau)$ may be calculated from the summations shown above; however, it may be possible to simplify these calculations by deriving simpler analytical expressions for the impulse responses. Because the impulse responses depend on the window function w(r), the derivation of simpler analytical expressions requires additional specifications for the window function. An example of derivations of simpler analytical expressions for the impulse responses for two specific window functions, the rectangular and sine window functions, are discussed below.

2. Rectangular Window Function

The rectangular window function is not often used in coding applications because it has relatively poor frequency selectivity properties; however, its simplicity reduces the complexity of the analysis needed to derive a specific implementation. For this derivation, the window function $$w(r) = \frac{1}{\sqrt{2}}$$

for $r \in [0,N-1]$ is used. For this particular window function, the second term of equation 41a is equal to zero. The calculation of the MDST coefficients does not depend on the MDCT coefficients for the second segment. As a result, equation 41a may be rewritten as $$S(2v) = \frac{2}{N}\sum_{p=0}^{N-1} m_{I,III}(p)h_{I,III}(2v-p) \tag{42}$$

$$m_{I,III}(\tau) = [(-1)^{\tau+1}X_I(\tau) + X_{III}(\tau)]h_{I,III}(\tau) = \frac{1}{2}\sum_{r=0}^{\frac{N}{2}-1} \cos\left[\frac{2\pi}{N}(\tau)(r+n_0)\right],$$

$$v \in \left[0, \frac{N}{2}-1\right]$$

If N is restricted to have a value that is a multiple of four, this equation can be simplified further by using another lemma that postulates the following equality:

$$\sum_{r=0}^{\frac{N}{2}-1} \cos\left[\frac{2\pi}{N}(q)(r+n_0)\right] = \begin{cases} (-1)^q \dfrac{\sin\frac{\pi q}{2}}{\sin\frac{\pi q}{N}} & q \text{ not a multiple of } N \\ (-1)^{\frac{q}{N}} \cdot \dfrac{N}{2} & q, \text{ a multiple of } N \end{cases} \tag{43}$$

$$\text{where } n_0 = \frac{\frac{N}{2}+1}{2}$$

This may be proven as follows:

$$\begin{aligned} I &= \sum_{r=0}^{\frac{N}{2}-1} \cos\left[\frac{2\pi}{N}(q)(r+n_0)\right] = \sum_{r=0}^{\frac{N}{2}-1} \sin\left[\frac{2\pi}{N}(q)(r+n_0)+\frac{\pi}{2}\right] \\ &= \sum_{r=0}^{\frac{N}{2}-1} \sin\left[\frac{2\pi}{N}(q)(r+n_0)+\frac{2\pi}{N}(q)\left(\frac{N}{4q}\right)\right] \\ &= \sum_{r=0}^{\frac{N}{2}-1} \sin\left[\frac{2\pi}{N}(q)\left(r+n_0+\frac{N}{4q}\right)\right] \end{aligned} \tag{44}$$

By using the lemma shown in equation 35 with $$a = n_0 + \frac{N}{4q},$$

expression 44 can be rewritten as $$I = \sin\left(\frac{2\pi q\left(n_0+\frac{N}{4q}\right)}{N} + \frac{\pi q}{2} - \frac{piq}{N}\right)\frac{\sin\frac{\pi q}{2}}{\sin\frac{\pi q}{N}} \tag{45}$$

which can be simplified to obtain the following expression:

$$I = (-1)^q \frac{\sin\frac{\pi q}{2}}{\sin\frac{\pi q}{N}} \tag{46}$$

If q is an integer multiple of N such that q=mN, then the numerator and denominator of the quotient in expression 46 are both equal to zero, causing the value of the quotient to be indeterminate. L'Hospital's rule may be used to simplify the expression further. Differentiating the numerator and denominator with respect to q and substituting q=mN yields the expression $$\frac{N\cdot\cos\left(\frac{\pi m N}{2}\right)}{2\cdot\cos(\pi m)}$$

Because N is an integer multiple of four, the numerator is always equal to N and the denominator is equal to $2\cdot(-1)^m=2\cdot(-1)^{q/N}$. This completes the proof of the lemma expressed by equation 43.

This equality may be used to obtain expressions for the impulse response $h_{I,III}$. Different cases are considered to evaluate the response $h_{I,III}(\tau)$. If $\tau$ is an integer multiple of N such that $\tau$=mN then $h_{I,III}(\tau)=(-1)^m \cdot N/4$. The response equals zero for even values of $\tau$ other than an integer multiple of N because the numerator of the quotient in equation 46 is equal to zero. The value of the impulse response $h_{I,III}$ for odd values of $\tau$ can be seen from inspection. The impulse response may be expressed as follows:

$$h_{I,III(\tau)} = (-1)^m \frac{N}{4} \text{ for } \tau = mN \tag{47}$$

$$h_{I,III(\tau)} = 0 \text{ for } \tau \text{ evenNull } \tau \neq 0$$

$$h_{I,III(\tau)} = \frac{1}{2} \frac{(-1)^{\frac{\tau+1}{2}}}{\sin\frac{\pi\tau}{N}} \tag{48}$$

Figure 6:
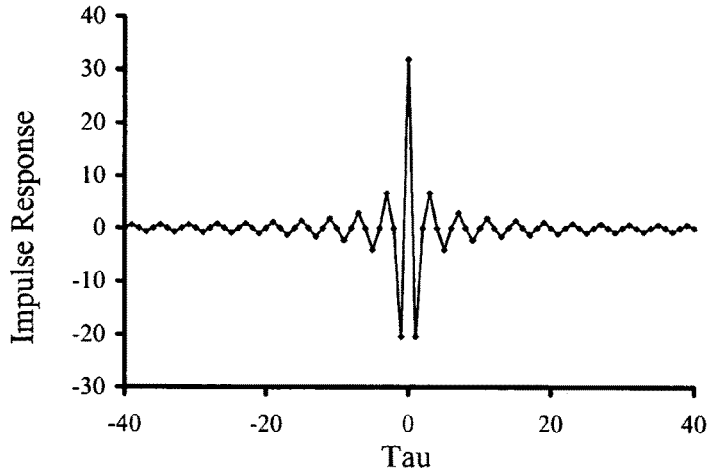
FIGS. 6-8 are graphical illustrations of impulse responses that may be used with exemplary implementations of the present invention.

The impulse response $h_{I,III}$ for a rectangular window function and N=128 is illustrated in FIG. 6.

By substituting these expressions into equation 42, equations 41a and 41b can be rewritten as:

$$S(2v) = \frac{2}{N}\sum_{p=0}^{N-1} m_{I,III}(p)h_{I,III}(2v-p) \tag{49a}$$

$$m_{I,III}(\tau) = [(-1)^{\tau+1}X_I(\tau) + X_{III}(\tau)]$$

$$h_{I,III}(\tau) = \begin{cases} (-1)^m \frac{N}{4}, \tau = mN \\ 0, \tau \neq mN \text{ and } \tau \text{ even} \\ \frac{1}{2} \cdot \frac{(-1)^{\frac{\tau+1}{2}}}{\sin\frac{3\tau}{N}}, \tau \text{ odd} \end{cases}$$

$$S(2v+1) = S(N-2(1+v))v \in \left[0, \frac{N}{2}-1\right] \tag{49b}$$

Using equations 49a and 49b, MDST coefficients for segment II can be calculated from the MDCT coefficients of segments I and III assuming the use of a rectangular window function. The computational complexity of this equation can be reduced by exploiting the fact that the impulse response $h_{I,III}(\tau)$ is equal to zero for many odd values of $\tau$.

3. Sine Window Function

The sine window function has better frequency selectivity properties than the rectangular window function and is used in some practical coding systems. The following derivation uses a sine window function defined by the expression $$w(r)=\sin(\pi/N(r+½)) \tag{50}$$

A simplified expression for the impulse response $h_{I,III}$ may be derived by using a lemma that postulates the following:

$$I(\tau) = \sum_{r=0}^{\frac{N}{2}-1} \omega(r)\omega\left(r+\frac{N}{2}\right)\cos\left[\frac{2\pi}{N}(\tau)(r+n_0)\right], \tag{51}$$

$$= \begin{cases} 0, \tau \text{ odd}, \tau \neq mN+1, \tau \neq mN-1 \\ -\frac{N}{S}(-1)^m, \tau = mN+1 \\ -\frac{N}{S}(-1)^m, \tau = mN+1 \\ \frac{(-1)^{\frac{3\tau}{2}}}{4}\left[\frac{1}{\sin\frac{\pi}{N}(\tau+1)} + \frac{1}{\sin\frac{\pi}{N}(-\tau+1)}\right], \tau \text{ even} \end{cases}$$

$$\text{where } \omega(r) = \sin\left(\frac{\pi}{N}\left(r+\frac{1}{2}\right)\right)$$

This lemma may be proven by first simplifying the expression for w(r)w(r+N/2) as follows:

$$\sin\left(\frac{\pi}{N}\left(r+\frac{1}{2}\right)\right)\sin\left(\frac{\pi}{N}\left(r+\frac{N}{2}+\frac{1}{2}\right)\right) = \tag{52}$$

$$\sin\left(\frac{\pi}{N}\left(r+\frac{1}{2}\right)\right)\sin\left(\frac{\pi}{N}\left(r+\frac{1}{2}\right)+\frac{\pi}{2}\right) =$$

$$\sin\left(\frac{\pi}{N}\left(r+\frac{1}{2}\right)\right)\cos\left(\frac{\pi}{N}\left(r+\frac{1}{2}\right)\right) = \frac{1}{2}\sin\left(\frac{2\pi}{N}\left(r+\frac{1}{2}\right)\right)$$

Substituting this simplified expression into equation 51 obtains the following:

$$I(\tau) = \frac{1}{2}\sum_{r=0}^{\frac{N}{2}-1} \sin\left[\frac{2\pi}{N}\left(r+\frac{1}{2}\right)\right]\cos\left[\frac{2\pi}{N}(\tau)(r+n_0)\right] \tag{53}$$

Using the following trigonometric identity $$\sin u \cos v = ½[\sin(u+v)+\sin(u-v)] \tag{54}$$

equation 53 can be rewritten as follows:

$$I(\tau) = \frac{1}{4}\sum_{r=0}^{\frac{N}{2}-1} \sin\left[\frac{2\pi}{N}\left(r+\frac{1}{2}\right)+\frac{2\pi}{N}(\tau)(r+n_0)\right] + \tag{55}$$

$$\frac{1}{4}\sum_{r=0}^{\frac{N}{2}-1} \sin\left[\frac{2\pi}{N}\left(r+\frac{1}{2}\right)+\frac{2\pi}{N}(\tau)(r+n_0)\right]$$

$$I(\tau) = \frac{1}{4}\sum_{r=0}^{\frac{N}{2}-1} \sin\left[\frac{2\pi}{N}\left(r+\frac{1}{2}\right)+\tau r+\tau n_0\right] +$$

$$\frac{1}{4}\sum_{r=0}^{\frac{N}{2}-1} \sin\left[\frac{2\pi}{N}\left((-\tau+1)r-\left(\tau n_0-\frac{1}{2}\right)\right)\right]$$

$$I(\tau) = \frac{1}{4}\sum_{r=0}^{\frac{N}{2}-1} \sin\left[\frac{2\pi}{N}\left((\tau+1)r+\left(\tau n_0+\frac{1}{2}\right)\right)\right] +$$

$$\frac{1}{4}\sum_{r=0}^{\frac{N}{2}-1} \sin\left[\frac{2\pi}{N}\left((-\tau+1)r-\left(\tau n_0-\frac{1}{2}\right)\right)\right]$$

-continued $$I(\tau)=\frac{1}{4}\sum_{r=0}^{\frac{N}{2}-1}\sin\left[\frac{2\pi}{N}(\tau+1)\left(r+\frac{\tau n_0+\frac{1}{2}}{\tau+1}\right)\right]+\frac{1}{4}\sum_{r=0}^{\frac{N}{2}-1}\sin\left[\frac{2\pi}{N}(-\tau+1)\left(r-\frac{\tau n_0-\frac{1}{2}}{-\tau+1}\right)\right] \tag{56}$$

Equation 55 can be simplified by substitution in both terms of I(τ) according to equation 35, setting q=(τ+1) and $$a=\frac{rn_0+\frac{1}{2}}{(\tau+1)}$$

in the first term, and setting q=(−τ+1) and $$a=\frac{rn_0+\frac{1}{2}}{(-\tau+1)}$$

in the second term. This yields the following:

$$I(\tau)=\frac{1}{4}\sin\left(\frac{2\pi}{N}\left(\tau n_0+\frac{1}{2}\right)+\frac{\pi}{2}(\tau+1)-\frac{\pi}{N}(\tau+1)\right)\frac{\sin\frac{\pi}{2}(\tau+1)}{\sin\frac{\pi}{N}(\tau+1)}+\frac{1}{4}\sin\left(\frac{2\pi}{N}\left(-\tau n_0+\frac{1}{2}\right)+\frac{\pi}{2}(-\tau+1)-\frac{\pi}{N}(-\tau+1)\right)\frac{\sin\frac{\pi}{2}(-\tau+1)}{\sin\frac{\pi}{N}(-\tau+1)} \tag{57}$$

$$I(\tau)=\frac{1}{4}\sin\left(\frac{\pi}{N}(\tau)\left(\frac{N}{2}+1\right)+\frac{\pi}{2}(\tau+1)-\frac{\pi}{N}(\tau)\right)\frac{\sin\frac{\pi}{2}(\tau+1)}{\sin\frac{\pi}{N}(\tau+1)}+\frac{1}{4}\sin\left(\frac{\pi}{N}(-\tau)\left(\frac{N}{2}+1\right)+\frac{\pi}{2}(-\tau+1)-\frac{\pi}{N}(-\tau)\right)\frac{\sin\frac{\pi}{2}(-\tau+1)}{\sin\frac{\pi}{N}(-\tau+1)}$$

$$I(\tau)=\frac{1}{4}\left(\frac{\pi}{2}(\tau)+\frac{\pi}{2}(\tau+1)\right)\frac{\sin\frac{\pi}{2}(\tau+1)}{\sin\frac{\pi}{N}(\tau+1)}+\frac{1}{4}\left(\frac{\pi}{2}(-\tau)+\frac{\pi}{2}(-\tau+1)\right)\frac{\sin\frac{\pi}{2}(-\tau+1)}{\sin\frac{\pi}{N}(-\tau+1)}$$

$$I(\tau)=\frac{1}{4}\sin\left(\pi(\tau)+\frac{\pi}{2}\right)\frac{\sin\frac{\pi}{2}(\tau+1)}{\sin\frac{\pi}{N}(\tau+1)}+\frac{1}{4}\sin\left(\pi(-\tau)+\frac{\pi}{2}\right)\frac{\sin\frac{\pi}{2}(-\tau+1)}{\sin\frac{\pi}{N}(-\tau+1)}$$

$$I(\tau)=\frac{1}{4}\cos(\pi\tau)\cdot\frac{\cos\frac{\pi}{2}\tau}{\sin\frac{\pi}{N}(\tau+1)}+\frac{1}{4}\cos(-\pi\tau)\cdot\frac{\cos\frac{-\pi}{2}\tau}{\sin\frac{-\pi}{N}(-\tau+1)} \tag{58}$$

$$I(\tau)=\frac{(-1)^T}{4}\cdot\frac{\cos\frac{\pi}{2}\tau}{\sin\frac{\pi}{N}(\tau+1)}+\frac{(-1)^T}{4}\cdot\frac{\cos\frac{\pi}{2}(-\tau)}{\sin\frac{-\pi}{N}(-\tau+1)}$$

$$I(\tau)=\frac{(-1)^T}{4}\cos\frac{\pi}{2}\tau\cdot\left[\frac{1}{\sin\frac{\pi}{N}(\tau+1)}+\frac{1}{\sin\frac{\pi}{N}(-\tau+1)}\right]$$

-continued $$I(\tau)=\begin{cases}\frac{(-1)^{\frac{3\tau}{2}}}{4}\left[\frac{1}{\sin\frac{\pi}{N}(\tau+1)}+\frac{1}{\sin\frac{\pi}{N}(-\tau+1)}\right], & \tau\text{ even}\\ 0, & \tau\text{ odd}\end{cases}$$

Equation 58 is valid unless the denominator for either quotient is equal to zero. These special cases can be analyzed by inspecting equation 57 to identify the conditions under which either denominator is zero. It can be seen from equation 57 that singularities occur for τ=mN+1 and τ=mN−1, where m is an integer. The following assumes N is an integer multiple of four.

For τ=mN+1 equation 57 can be rewritten as:

$$I(mN+1)=\frac{1}{4}\sin\left(\pi(mN+1)+\frac{\pi}{2}\right)\cdot\frac{\sin\frac{\pi}{2}(mN+2)}{\sin\frac{\pi}{2}(mN+1)}+\frac{1}{4}\sin\left(-\pi(mN+1)+\frac{\pi}{2}\right)\cdot\frac{\sin\frac{\pi}{2}(-(mN+1)+1)}{\sin\frac{\pi}{2}(-(mN+1)+1)}$$

$$=0+\frac{1}{4}\sin\left(-\pi mN-\frac{\pi}{2}\right)\frac{\sin\frac{-mN\pi}{2}}{\sin\frac{-mN\pi}{N}}$$

$$=-\frac{1}{4}\frac{\sin\frac{-mN\pi}{2}}{\sin\frac{-mN\pi}{N}} \tag{59}$$

The value of the quotient is indeterminate because the numerator and denominator are both equal to zero. L'Hospital's rule can be used to determine its value. Differentiating numerator and denominator with respect to m yields the following:

$$I(mN+1)=-\frac{1}{4}\frac{-\frac{N\pi}{2}\cos\frac{-mN\pi}{2}}{-\pi\cos-mn}$$

$$=-\frac{N}{8}(-1)^m \tag{60}$$

For τ=mN−1 equation 57 can be rewritten as:

$$I(mN-1)=\frac{1}{4}\sin\left(\pi(mN-1)+\frac{\pi}{2}\right)\cdot\frac{\sin\frac{\pi}{2}(mN+1-1)}{\sin\frac{\pi}{2}(mN+1-1)}+\frac{1}{4}\sin\left(-\pi(mN-1)+\frac{\pi}{2}\right)\cdot\frac{\sin\frac{\pi}{2}(mN-1+1)}{\sin\frac{\pi}{2}(mN-1+1)} \tag{61}$$

$$I(mN-1)=\frac{1}{4}\sin\left(\pi mN-\frac{\pi}{2}\right)\frac{\sin\frac{\pi mN}{2}}{\sin\frac{\pi mN}{2}}+0$$

The value of the quotient in this equation is indeterminate because the numerator and denominator are both equal to zero. L'Hospital's rule can be used to determine its value. Differentiating numerator and denominator with respect to m yields the following:

$$I(mN-1) = -\frac{1}{4}\frac{\frac{\pi N}{2}}{\frac{\pi}{N}}\cdot\frac{\cos\frac{\pi mN}{2}}{\cos\pi m} = -\frac{N}{8}(-1)^m \tag{62}$$

The lemma expressed by equation 51 is proven by combining equations 58, 60 and 62.

A simplified expression for the impulse response $h_{II}$ may be derived by using a lemma that postulates the following:

$$I(\tau) = \sum_{r=0}^{\frac{N}{2}-1}\omega(r)\omega(r)\sin\left[\frac{2\pi}{N}(\tau)(r+n_0)\right], \tag{63}$$

$$= \begin{cases} 0,\ \tau\text{odd},\ \tau \neq mN+1,\ \tau \neq mN-1- \\ \frac{N}{S}(-1)^m,\ \tau = mN+1- \\ \frac{N}{S}(-1)^{m+1},\ \tau = mN-1 \\ \frac{(-1)^{\frac{\delta r}{2}}}{4}\left[\frac{1}{\sin\frac{\pi}{N}(\tau+1)}+\frac{1}{\sin\frac{\pi}{N}(-\tau+1)}\right],\ \tau\text{ even} \end{cases}$$

where $$\omega(r) = \sin\left[\frac{\pi}{N}\left(r+\frac{1}{2}\right)\right]$$

The proof of this lemma is similar to the previous proof. This proof begins by simplifying the expression for w(r)w(r). Recall that $\sin^2\alpha = \frac{1}{2} - \frac{1}{2}\cos(2a)$, so that:

$$\sin^2\left(\frac{\pi}{N}\left(r+\frac{1}{2}\right)\right) = \frac{1}{2} - \frac{1}{2}\cos\left(\frac{2\pi}{N}\left(r+\frac{1}{2}\right)\right) \tag{64}$$

Using this expression, equation 63 can be rewritten as:

$$I(\tau) = \sum_{r=0}^{\frac{N}{2}-1}\left[\frac{1}{2}-\frac{1}{2}\cos\left(\frac{2\pi}{N}\left(r+\frac{1}{2}\right)\right)\right]\sin\left[\frac{2\pi}{N}(\tau)(r+n_0)\right] \tag{65}$$

$$= \frac{1}{2}\sum_{r=0}^{\frac{N}{2}-1}\sin\left[\frac{2\pi}{N}(\tau)(r+n_0)\right] - \frac{1}{2}\sum_{r=0}^{\frac{N}{2}-1}\cos\left(\frac{2\pi}{N}\left(r+\frac{1}{2}\right)\right)\sin\left[\frac{2\pi}{N}(\tau)(r+n_0)\right]$$

From equation 37 and the associated lemma, it may be seen the first term in equation 65 is equal to zero. The second term may be simplified using the trigonometric identity $\cos u\cdot\sin v = \frac{1}{2}[\sin(u+v) - \sin(u-v)]$, which obtains the following:

$$I(\tau) = -\frac{1}{4}\sum_{r=0}^{\frac{N}{2}-1}\sin\left[\frac{2\pi}{N}\left(r+\frac{1}{2}\right)+\frac{2\pi}{N}(\tau)(r+n_0)\right] + \tag{66}$$

-continued $$\frac{1}{4}\sum_{r=0}^{\frac{N}{2}-1}\sin\left[\frac{2\pi}{N}\left(r+\frac{1}{2}\right)-(\tau)(r+n_0)\right]$$

Referring to equation 66, its first term is equal to the negative of the first term in equation 55 and its second term is equal to the second term of equation 55. The proof of the lemma expressed in equation 63 may be proven in a manner similar to that used to prove the lemma expressed in equation 51. The principal difference in the proof is the singularity analyses of equation 59 and equation 61. For this proof, I(mN−1) is multiplied by an additional factor of −1; therefore, $$I(mN-1) = \frac{N}{8}(-1)^{m+1}.$$

Allowing for this difference along with the minus sign preceding the first term of equation 55, the lemma expressed in equation 63 is proven.

An exact expression for impulse response $h_{II}(\tau)$ is given by this lemma; however, it needs to be evaluated only for odd values of τ because the modified convolution of $h_{II}$ in equation 41a is evaluated only for τ=(2v−(2l+1)). According to equation 63, $h_{II}(\tau)=0$ for odd values of τ except for τ=mN+1 and τ=mN−1. Because $h_{II}(\tau)$ is non-zero for only two values of τ, this impulse response can be expressed as:

$$h_{II}(\tau) = \begin{cases} -\frac{N}{S}(-1)^m, & \tau = mN+1 \\ -\frac{N}{S}(-1)^{m+1}, & \tau = mN-1 \\ 0, & \text{otherwise} \end{cases} \tag{67}$$

Figure 7:
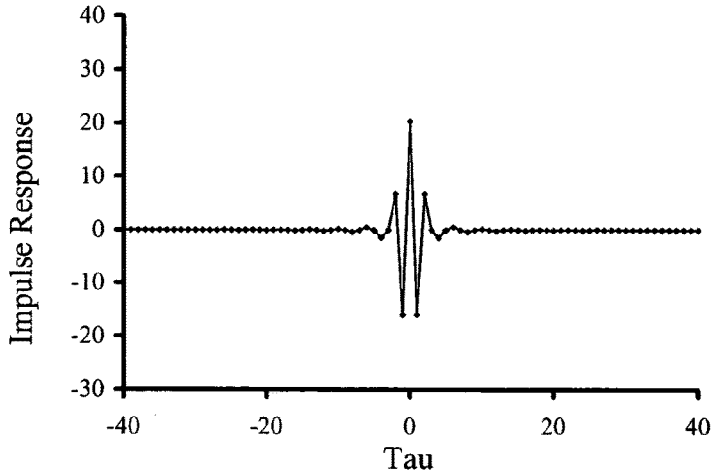
Figure 8:
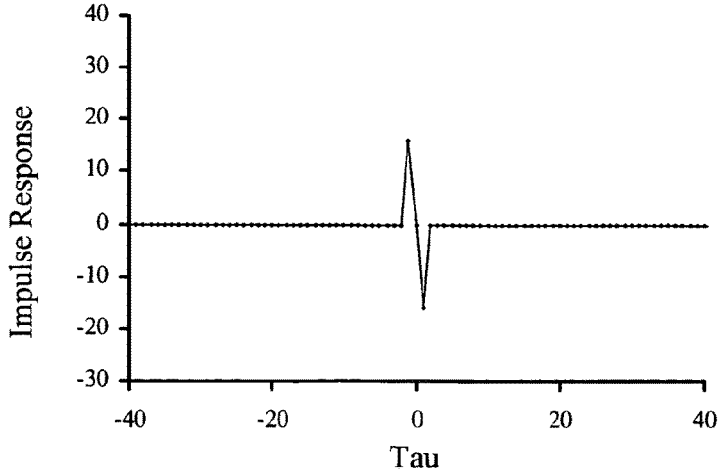

The impulse responses $h_{I,III}(\tau)$ and $h_{II}(\tau)$ for the sine window function and N=128 are illustrated in FIGS. 7 and 8, respectively.

Using the analytical expressions for the impulse responses $h_{I,III}$ and $h_{II}$ provided by equations 51 and 67, equations 41a and 41b can be rewritten as:

$$S(2v) = \frac{2}{N}\sum_{p=0}^{N-1}m_{I,III}(p)h_{I,III}(2v-p) + \frac{4}{N}\sum_{i=0}^{\frac{N}{2}-1}m_{II}(2l+1)h_{II}(2v-(2l+1)), \tag{68a}$$

where $$m_{I,III}(\tau) = [(-1)^{\tau+1}X_I(\tau) + X_{III}(\tau)]$$

$$m_{II}(\tau) = X_{II}(\tau)$$

$$h_{I,III}(\tau) = \begin{cases} 0,\ \tau\text{odd},\ \tau \neq mN+1,\ \tau \neq mN-1- \\ \frac{N}{S}(-1)^m,\ \tau = mN+1- \\ \frac{N}{S}(-1)^m,\ \tau = mN-1 \\ \frac{(-1)^{\frac{\delta r}{2}}}{4}\left[\frac{1}{\sin\frac{\pi}{N}(\tau+1)}+\frac{1}{\sin\frac{\pi}{N}(-\tau+1)}\right],\ \tau\text{ even} \end{cases}$$

-continued $$h_{II}(\tau) = \begin{cases} -\frac{N}{S}(-1)^m, \ \tau = mN + 1 \\ -\frac{N}{S}(-1)^{m+1}, \ \tau = mN - 1 \\ 0, \text{ otherwise} \end{cases}$$

$$S(2v + 1) = S(N - 2(1 + v)) \tag{68b}$$

Using equations 68a and 68b, MDST coefficients for segment II can be calculated from the MDCT coefficients of segments I, II and III assuming the use of a sine window function. The computational complexity of this equation can be reduced further by exploiting the fact that the impulse response $h_{I,III}(\tau)$ is equal to zero for many odd values of $\tau$.

C. Spectral Component Estimation

Equations 41a and 41b express a calculation of exact MDST coefficients from MDCT coefficients for an arbitrary window function. Equations 49a, 49b, 68a and 68b express calculations of exact MDST coefficients from MDCT coefficients using a rectangular window function and a sine window function, respectively. These calculations include operations that are similar to the convolution of impulse responses. The computational complexity of calculating the convolution-like operations can be reduced by excluding from the calculations those values of the impulse responses that are known to be zero.

The computational complexity can be reduced further by excluding from the calculations those portions of the full responses that are of lesser significance; however, this resulting calculation provides only an estimate of the MDST coefficients because an exact calculation is no longer possible. By controlling the amounts of the impulse responses that are excluded from the calculations, an appropriate balance between computational complexity and estimation accuracy can be achieved.

The impulse responses themselves are dependent on the shape of the window function that is assumed. As a result, the choice of window function affects the portions of the impulse responses that can be excluded from calculation without reducing coefficient estimation accuracy below some desired level.

An inspection of equation 49a for rectangular window functions shows the impulse response $h_{I,III}$ is symmetric about $\tau=0$ and decays moderately rapidly. An example of this impulse response for N=128 is shown in FIG. 6. The impulse response $h_{II}$ is equal to zero for all values of $\tau$.

An inspection of equation 68a for the sine window function shows the impulse response $h_{I,III}$ is symmetric about $\tau=0$ and decays more rapidly than the corresponding response for the rectangular window function. For the sine window function, the impulse response $h_{II}$ is non-zero for only two values of $\tau$. An example of the impulse responses $h_{I,III}$ and $h_{II}$ for a sine window function and N=128 are shown in FIGS. 7 and 8, respectively.

Based on these observations, a modified form of equations 41a and 41b that provides an estimate of MDST coefficients for any analysis or synthesis window function may be expressed in terms of two filter structures as follows:

$$S(2v) = \text{filter_structure_1}(2v) + \text{filter_structure_2}(2v) \tag{69}$$

$$\text{filter_structure_1}(2v) = \frac{2}{N}\sum_{p=0}^{N-1} m_{I,III}(p)h_{I,III}(2v - p) \tag{70}$$

-continued $$m_{I,III}(\tau) = [(-1)^{\tau+1}X_I(\tau) + X_{III}(\tau)] \tag{71}$$

$$h_{I,III}(\tau) = \begin{cases} 0 \text{ if } \tau \in [\tau_{trunc1}, \ N - \tau_{trunc1}] \\ \sum_{r=0}^{\frac{N}{2}-1} \omega(\tau)\omega\left(r + \frac{N}{2}\right) \cdot \\ \cos\left[\frac{2\pi}{N}(\tau)(r + n_0)\right], \ o \cdot \omega. \end{cases} \tag{72}$$

$$\text{filter_structure_2}(2v) = \frac{4}{N}\sum_{l=0}^{\frac{N}{2}-1} m_{II}(2l + 1)h_{II}(2v - (2l + 1)) \tag{73}$$

$$m_{II}(\tau) = X_{II}(\tau) \tag{74}$$

$$h_{II}(\tau) = \begin{cases} 0 \text{ if } \tau \in \left[\tau_{trunc2}, \ \frac{N}{2} - 1 - \tau_{trunc2}\right] \\ \sum_{r=0}^{\frac{N}{2}-1} \omega^2(r)\sin\left[\frac{2\pi}{N}(\tau)(r + n_0)\right] \end{cases} \tag{75}$$

$$S(2v + 1) = S(N - 2(1 + v)) \tag{76}$$

where $$v \in \left[0, \ \frac{N}{2} - 1\right], \ n_0 = \frac{\frac{N}{2} + 1}{2} \text{ and} \tag{77}$$

$ntaps_{tot}$, $\tau_{trunc1}$, $\tau_{trunc2}$ are chosen to satisfy $$\tau_{trunc1} \in \left[1, \frac{N}{2}\right], \ \tau_{trunc2} \in \left[1, \frac{N}{4} - 1\right], \tag{78}$$

$$ntaps_{tot} = 2\tau_{trunc1} - 1 + 2\tau_{trunc2}$$

Figure 3:
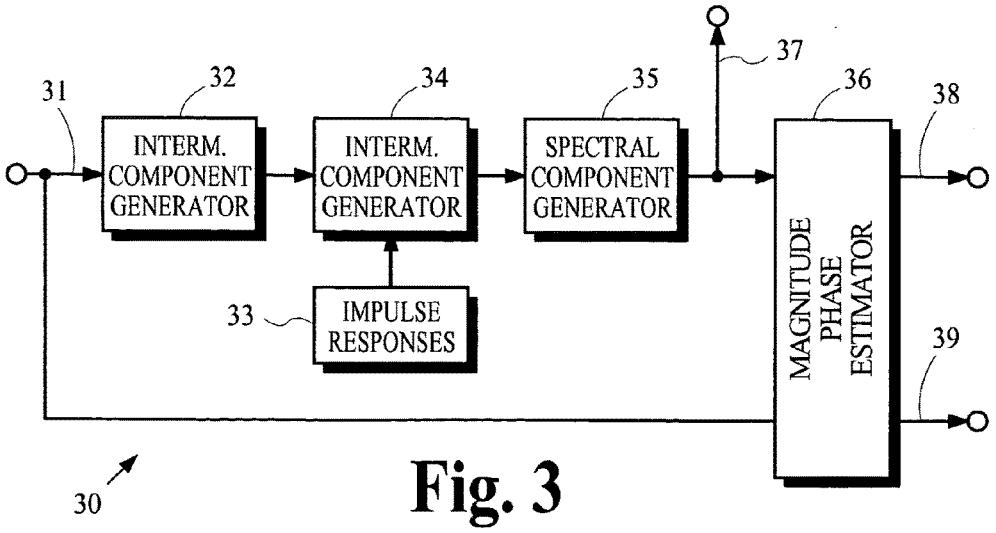
FIG. 3 is a schematic block diagram of a device that obtains measures of spectral component magnitude or phase according to various aspects of the present invention.

An example of a device 30 that estimates MDST coefficients according to equation 69 is illustrated by a schematic block diagram in FIG. 3. In this implementation, the intermediate component generator 32 receives MDCT coefficients from the path 1 and derives first intermediate components $m_{I,III}$ from the MDCT coefficients $X_I$ and $X_{II}$ of segments I and III, respectively, by performing the calculations shown in equation 71, and derives first intermediate components $m_{II}$ from the MDCT coefficients $X_{II}$ of segment II by performing the calculations shown in equation 74. The intermediate component generator 34 derives second intermediate components by forming a combination of first intermediate components $m_{I,III}$ according to a portion of the impulse response $h_{I,III}$ received from the impulse responses 33 by performing the calculations shown in equation 70, and derives second intermediate components by forming a combination of first intermediate components $m_{II}$ according to a portion of the impulse response $h_{II}$ received from the impulse responses 33 by performing the calculations shown in equation 73. Any portion of the two impulse responses may be used as expressed by the values $\tau_{trunc1}$ and $\tau_{trunc2}$ including the entire responses. The use of longer impulse responses increases computational complexity and generally increases the accuracy of MDST coefficient estimation. The spectral component generator 35 obtains MDST coefficients from the second intermediate components by performing the calculations shown in equations 69 and 76.

The magnitude and phase estimator 36 calculates measures of magnitude and phase from the calculated MDST coefficients and the MDCT coefficients received from the path 31 and passes these measures along the paths 38 and 39. The MDST coefficients may also be passed along the path 37. Measures of spectral magnitude and phase may be obtained by performing the calculations shown above in equations 10 and 11, for example. Other examples of measures that may be obtained include spectral flux, which may be obtained from the first derivative of spectral magnitude, and instantaneous frequency, which may be obtained from the first derivative of spectral phase.

Referring to the impulse responses shown in FIGS. 6-8, for example, it may be seen that the coefficient values obtained by the convolution-type operations of the two filter structures are dominated by the portions of the responses that are near $\tau=0$. A balance between computational complexity and estimation accuracy may be achieved for a particular implementation by choosing the total number of filter taps $ntaps_{tot}$ that are used to implement the two filter structures. The total number of taps $ntaps_{tot}$ may be distributed between the first and second filter structures as desired according to the values of $\tau_{trunc1}$ and $\tau_{trunc2}$, respectively, to adapt MDST coefficient estimation to the needs of specific applications. The distribution of taps between the two filter structures can affect estimation accuracy but it does not affect computational complexity.

The number and choice of taps for each filter structure can be selected using any criteria that may be desired. For example, an inspection of two impulse responses $h_{I,III}$ and $h_{II}$ will reveal the portions of the responses that are more significant. Taps may be chosen for only the more significant portions. In addition, computational complexity may be reduced by obtaining only selected MDST coefficients such as the coefficients in one or more frequency ranges.

An adaptive implementation of the present invention may use larger portions of the impulse responses to estimate the MDST coefficients for spectral components that are judged to be perceptually more significant by a perceptual model. For example, a measure of perceptual significance for a spectral component could be derived from the amount by which the spectral component exceeds a perceptual masking threshold that is calculated by a perceptual model. Shorter portions of the impulse responses may be used to estimate MDST coefficients for perceptually less significant spectral components. Calculations needed to estimate MDST coefficients for the least significant spectral components can be avoided.

A non-adaptive implementation may obtain estimates of MDST coefficients in various frequency subbands of a signal using portions of the impulse responses whose lengths vary according to the perceptual significance of the subbands as determined previously by an analysis of exemplary signals. In many audio coding applications, spectral content in lower frequency subbands generally has greater perceptual significance than spectral content in higher frequency subbands. In these applications, for example, a non-adaptive implementation could estimate MDST coefficients in subbands using portions of the impulse responses whose length varies inversely with the frequency of the subbands.

D. Additional Considerations

The preceding disclosure sets forth examples that describes only a few implementations of the present invention. Principles of the present invention may be applied and implemented in a wide variety of ways. Additional considerations are discussed below.

1. Other Transforms

The exemplary implementations described above are derived from the MDCT that is expressed in terms of the ODFT as applied to fixed-length segments of a source signal that overlap one another by half the segment length. A variation of the examples discussed above as well as a variation of the alternatives discussed below may be obtained by deriving implementations from the MDST that is expressed in terms of the ODFT.

Additional implementations of the present invention may be derived from expressions of other transforms including the DFT, the FFT and a generalized expression of the MDCT filter bank discussed in the Princen paper cited above. This generalized expression is described in U.S. Pat. No. 5,727,119 issued Mar. 10, 1998.

Implementations of the present invention also may be derived from expressions of transforms that are applied to varying-length signal segments and transforms that are applied to segments having no overlap or amounts of overlap other than half the segment length.

2. Adaptive Estimation

Some empirical results suggest that an implementation of the present invention with a specified level of computational complexity is often able to derive measures of spectral component magnitude that is more accurate for spectral components representing a band of spectral energy than it is for spectral components representing a single sinusoid or a few sinusoids that are isolated from one another in frequency. The process that estimates spectral component magnitude may be adapted in at least two ways to improve estimation accuracy for signals that have isolated spectral components.

One way to adapt the process is by adaptively increasing the length of the impulse responses for two filter structures shown in equation 69 so that more accurate computations can be performed for a restricted set of MDST coefficients that are related to the one or more isolated spectral components.

Another way to adapt this process is by adaptively performing an alternate method for deriving spectral component magnitudes for isolated spectral components. The alternate method derives an additional set of spectral components from the MDCT coefficients and the additional set of spectral components are used to obtain measures of magnitude and/or phase. This adaptation may be done by selecting the more appropriate method for segments of the source signal, and it may be done by using the more appropriate method for portions of the spectrum for a particular segment. A method that is described in the Merdjani paper cited above is one possible alternate method. If it is used, this method preferably is extended to provide magnitude estimates for more than a single sinusoid. This may be done by dynamically arranging MDCT coefficients into bands of frequencies in which each band has a single dominant spectral component and applying the Merdjani method to each band of coefficients.

The presence of a source signal that has one dominant spectral component or a few isolated dominant spectral components may be detected using a variety of techniques. One technique detects local maxima in MDCT coefficients having magnitudes that exceed the magnitudes of adjacent and nearby coefficients by some threshold amount and either counting the number of local maxima or determining the spectral distance between local maxima. Another technique determines the spectral shape of the source signal by calculating an approximate Spectral Flatness Measure (SFM) of the source signal. The SFM is described in N. Jayant et al., "Digital Coding of Waveforms," Prentice-Hall, 1984, p.

57, and is defined as the ratio of the geometric mean and the arithmetic mean of samples of the power spectral density of a signal.

3. Implementation

The present invention may be used advantageously in a wide variety of applications. Schematic block diagrams of a transmitter and a receiver incorporating various aspects of the present invention are shown in FIGS. 4 and 5, respectively.

Figure 4:
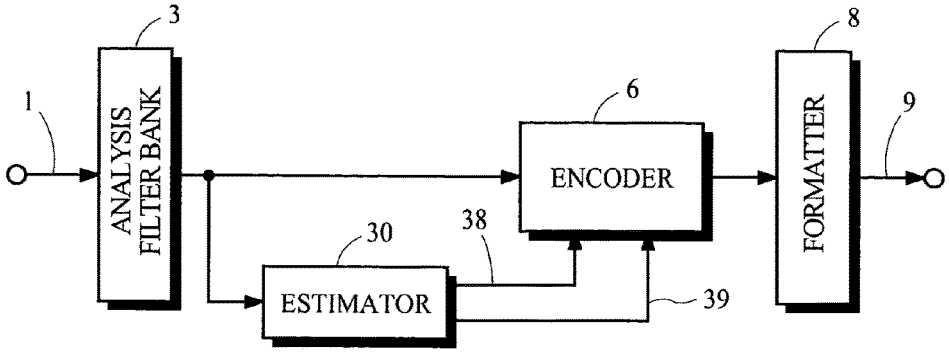
FIG. 4 is a schematic block diagram of a transmitter that incorporates various aspects of the present invention.

The transmitter shown in FIG. 4 is similar to the transmitter shown in FIG. 1 and includes the estimator 30, which incorporates various aspects of the present invention to provide measures of magnitude and phase along the paths 38 and 39, respectively. The encoder 6 uses these measures to generate encoded information representing the spectral components received from the analysis filter bank 3. Examples of processes that may be used in the encoder 6, which may depend on the measures of magnitude or phase, include perceptual models used to determine adaptive quantization levels, coupling, and spectral envelope estimation for later use by spectral regeneration decoding processes.

Figure 5:
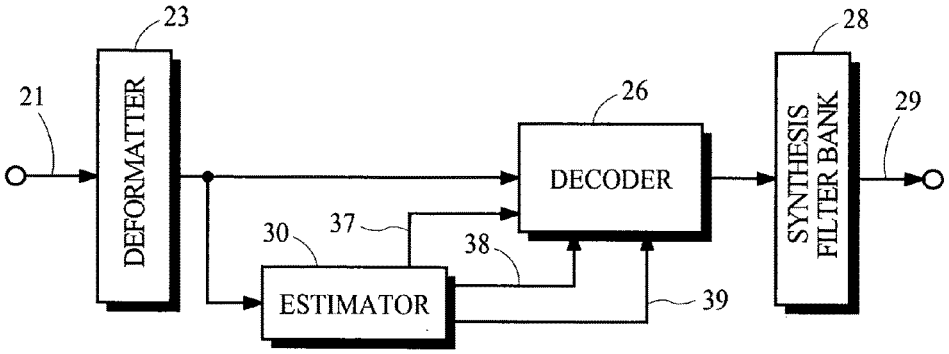
FIG. 5 is a schematic block diagram of a receiver that incorporates various aspects of the present invention.

The receiver shown in FIG. 5 is similar to the receiver shown in FIG. 2 and includes the estimator 30, which incorporates various aspects of the present invention to provide measures of magnitude and phase along the paths 38 and 39, respectively. The estimator 30 may also provide MDST coefficients along the path 37. The decoder 26 uses these measures to obtain spectral components from encoded information received from the deformatter 23. Examples of processes that may be used in the decoder 26, which may depend on the measures of magnitude or phase, include perceptual models used to determine adaptive quantization levels, spectral component synthesis from composite or coupled representations, and spectral component regeneration.

Figure 9:
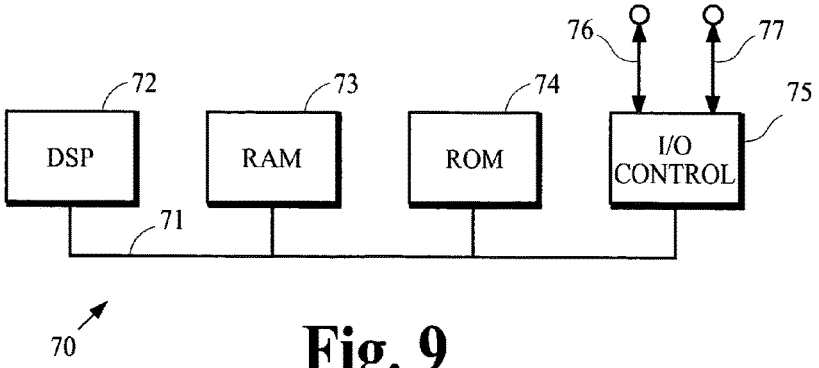
FIG. 9 is a schematic block diagram of a device that may be used to implement various aspects of the present invention.

Devices that incorporate various aspects of the present invention may be implemented in a variety of ways including software for execution by a computer or some other apparatus that includes more specialized components such as digital signal processor (DSP) circuitry coupled to components similar to those found in a general-purpose computer. FIG. 9 is a schematic block diagram of device 70 that may be used to implement aspects of the present invention. DSP 72 provides computing resources. RAM 73 is system random access memory (RAM) used by DSP 72 for signal processing. ROM 74 represents some form of persistent storage such as read only memory (ROM) for storing programs needed to operate device 70 and to carry out various aspects of the present invention. I/O control 75 represents interface circuitry to receive and transmit signals by way of communication channels 76, 77. Analog-to-digital converters and digital-to-analog converters may be included in I/O control 75 as desired to receive and/or transmit analog signals. In the embodiment shown, all major system components connect to bus 71, which may represent more than one physical bus; however, a bus architecture is not required to implement the present invention.

In embodiments implemented in a general purpose computer system, additional components may be included for interfacing to devices such as a keyboard or mouse and a display, and for controlling a storage device having a storage medium such as magnetic tape or disk, or an optical medium. The storage medium may be used to record programs of instructions for operating systems, utilities and applications, and may include embodiments of programs that implement various aspects of the present invention.

The functions required to practice various aspects of the present invention can be performed by components that are implemented in a wide variety of ways including discrete logic components, integrated circuits, one or more ASICs and/or program-controlled processors. The manner in which these components are implemented is not important to the present invention.

Software implementations of the present invention may be conveyed by a variety of machine readable media such as baseband or modulated communication paths throughout the spectrum including from supersonic to ultraviolet frequencies, or storage media that convey information using essentially any recording technology including magnetic tape, cards or disk, optical cards or disc, and detectable markings on media like paper.

What is claimed is:

[1. A method of processing information representing a source signal conveying content intended for human perception, the method comprising:

receiving first spectral components that were generated by application of an analysis filterbank to the source signal, wherein the first spectral components represent spectral content of the source signal expressed in a first subspace of a multidimensional space;

deriving one or more first intermediate components from at least some of the first spectral components, wherein at least some of the first intermediate components differ from the first spectral components from which they are derived;

forming a combination of the one or more first intermediate components according to at least a portion of one or more impulse responses to obtain one or more second intermediate components;

deriving one or more second spectral components from the one or more second intermediate components, wherein the second spectral components represent spectral content of the source signal expressed in a second subspace of the multidimensional space that includes a portion of the multidimensional space not included in the first subspace;

obtaining estimated measures of magnitude or phase using the first spectral components and the second spectral components; and applying an adaptive process to the first spectral components to generate processed information, wherein the adaptive process is responsive to the estimated measures of magnitude or phase.]

[2. The method of claim 1, wherein:

the first spectral components are transform coefficients arranged in one or more blocks of transform coefficients that were generated by application of one or more transforms to one or more segments of the source signal; and the portions of the one or more impulse responses are based on frequency response characteristics of the one or more transforms.]

[3. The method of claim 2, wherein the frequency response characteristics of the one or more transforms are dependent on characteristics of one or more analysis window functions that were applied with the one or more transforms to the one or more segments of the source signal.]

[4. The method of claim 3, wherein at least some of the one or more transforms implement an analysis filter bank that generates the first spectral components with time-domain aliasing.]

[5. The method of claim 3, wherein at least some of the one or more transforms generate first spectral components having real values expressed in the first subspace, and wherein the second spectral values have imaginary values expressed in the second subspace.]

[6. The method of claim 5, wherein the transforms that generate first spectral components having real values expressed in the first subspace are Discrete Cosine Transforms or Modified Discrete Cosine Transforms.]

[7. The method of claim 1, wherein:

the first spectral components are transform coefficients arranged in one or more blocks of transform coefficients that were generated by application of one or more transforms to one or more segments of the source signal, the one or more second intermediate components are obtained by combining the one or more first intermediate components according to a portion of the one or more impulse responses, each of the one or more impulse responses comprise a respective set of elements arranged in order, and the portion of each of the one or more impulse responses excludes every other element in the respective set of elements.]

[8. The method according to claim 1 that further comprises obtaining estimated measures of magnitude or phase using one or more third spectral components that are derived from at least some of the one or more first spectral components.]

[9. The method according to claim 8, wherein:

the first spectral components are transform coefficients arranged in one or more blocks of transform coefficients that were generated by application of one or more transforms to one or more segments of the source signal;

the third spectral components are derived from a combination of two or more of the first spectral components; and the estimated measures of magnitude or phase for a respective segment of the source signal are obtained adaptively using either the third spectral components or using the first and second spectral components.]

[10. The method according to claim 8, wherein:

the first spectral components are transform coefficients arranged in one or more blocks of transform coefficients that were generated by application of one or more transforms to one or more segments of the source signal;

the third spectral components are derived from a combination of two or more of the first spectral components; and the estimated measures of magnitude or phase for at least some spectral content of a respective segment of the source signal are obtained using the third spectral components and the estimated measures of magnitude or phase for at least some of the spectral content of the respective segment of the source signal are obtained using the first and second spectral components.]

[11. The method according to claim 8 or 10 that comprises obtaining measures of magnitude or phase adaptively using either the third spectral components or using the first and second spectral components.]

[12. The method of claim 1 that comprises adapting the portion of the one or more impulse responses in response to a measure of spectral component significance.]

[13. The method of claim 12, wherein the measure of spectral component significance is provided by a perceptual model that assesses perceptual significance of the spectral content of the source signal.]

[14. The method of claim 12, wherein the measure of spectral component significance reflects isolation in frequency of one or more spectral components.]

[15. The method of claim 1, wherein:

the first spectral components are first transform coefficients arranged in one or more blocks that were generated by application of one or more transforms to one or more segments of the source signal, a respective block having a first number of first transform coefficients;

the second spectral components are second transform coefficients;

a second number of second transform coefficients are derived that represent spectral content that is also represented by some of the first transform coefficients in the respective block; and the second number is less than the first number.]

[16. The method according to claim 1, 2, 9, 10 or 12 that comprises:

applying the adaptive process to the first spectral components to generate synthesized spectral components;

deriving one or more third intermediate components from the first spectral components and/or the second spectral components and from the synthesized spectral components; and generating one or more output signals conveying content intended for human perception by applying one or more synthesis filterbanks to the one or more third intermediate components.]

[17. The method according to claim 16, wherein at least some of the synthesized spectral components are generated by spectral component regeneration.]

[18. The method according to claim 16, wherein at least some of the synthesized spectral components are generated by decomposition of first spectral components and/or second spectral components representing a composite of spectral content for a plurality of source signals.]

[19. The method according to claim 16, wherein at least some of the synthesized spectral components are generated by combining first spectral components and/or second spectral components to provide a composite representation of spectral content for a plurality of source signals.]

[20. The method according to claim 1, 2, 9, 10 or 12 that comprises:

generating the first spectral components by applying the analysis filter bank to the source signal;

applying the adaptive process to the first spectral component to generate encoded information representing at least some of the first spectral components; and generating an output signal conveying the encoded information.]

[21. A medium conveying a program of instructions that is executable by a device to perform a method of processing information representing a source signal conveying content intended for human perception, the method comprising:

receiving first spectral components that were generated by application of an analysis filterbank to the source signal, wherein the first spectral components represent spectral content of the source signal expressed in a first subspace of a multidimensional space;

deriving one or more first intermediate components from at least some of the first spectral components, wherein at least some of the first intermediate components differ from the first spectral components from which they are derived;

forming a combination of the one or more first intermediate components according to at least a portion of one or more impulse responses to obtain one or more second intermediate components;

deriving one or more second spectral components from the one or more second intermediate components, wherein the second spectral components represent spectral content of the source signal expressed in a second subspace of the multidimensional space that includes a portion of the multidimensional space not included in the first subspace;

obtaining estimated measures of magnitude or phase using the first spectral components and the second spectral components; and applying an adaptive process to the first spectral components to generate processed information, wherein the adaptive process is responsive to the estimated measures of magnitude or phase.]

[22. The medium of claim 21, wherein:

the first spectral components are transform coefficients arranged in one or more blocks of transform coefficients that were generated by application of one or more transforms to one or more segments of the source signal; and the portions of the one or more impulse responses are based on frequency response characteristics of the one or more transforms, which are dependent on characteristics of one or more analysis window functions that were applied with the one or more transforms to the one or more segments of the source signal.]

[23. The medium according to claim 21, wherein the method further comprises obtaining estimated measures of magnitude or phase using one or more third spectral components that are derived from at least some of the one or more first spectral components.]

[24. The medium according to claim 23, wherein:

the first spectral components are transform coefficients arranged in one or more blocks of transform coefficients that were generated by application of one or more transforms to one or more segments of the source signal;

the third spectral components are derived from a combination of two or more of the first spectral components; and the estimated measures of magnitude or phase for a respective segment of the source signal are obtained adaptively using either the third spectral components or using the first and second spectral components.]

[25. The medium according to claim 23, wherein:

the first spectral components are transform coefficients arranged in one or more blocks of transform coefficients that were generated by application of one or more transforms to one or more segments of the source signal;

the third spectral components are derived from a combination of two or more of the first spectral components; and the estimated measures of magnitude or phase for at least some spectral content of a respective segment of the source signal are obtained using the third spectral components and the estimated measures of magnitude or phase for at least some of the spectral content of the respective segment of the source signal are obtained using the first and second spectral components.]

[26. The medium according to claim 23, wherein the method comprises obtaining measures of magnitude or phase adaptively using either the third spectral components or using the first and second spectral components.]

[27. The medium of claim 21, wherein the method comprises adapting the portion of the one or more impulse responses in response to a measure of spectral component significance.]

[28. The medium of claim 27, wherein the measure of spectral component significance is provided by a perceptual model that assesses perceptual significance of the spectral content of the source signal.]

[29. The medium of claim 27, wherein the measure of spectral component significance reflects isolation in frequency of one or more spectral components.]

[30. The medium of claim 21, wherein:

the first spectral components are first transform coefficients arranged in one or more blocks that were generated by application of one or more transforms to one or more segments of the source signal, a respective block having a first number of first transform coefficients;

the second spectral components are second transform coefficients;

a second number of second transform coefficients are derived that represent spectral content that is also represented by some of the first transform coefficients in the respective block; and the second number is less than the first number.]

[31. The medium according to claim 21, wherein the method comprises:

applying the adaptive process to the first spectral components to generate synthesized spectral components;

deriving one or more third intermediate components from the first spectral components and/or the second spectral components and from the synthesized spectral components; and generating one or more output signals conveying content intended for human perception by applying one or more synthesis filterbanks to the one or more third intermediate components.]

[32. The medium according to claim 21, wherein the method comprises:

generating the first spectral components by applying the analysis filter bank to the source signal;

applying the adaptive process to the first spectral component to generate encoded information representing at least some of the first spectral components; and generating an output signal conveying the encoded information.]

[33. An apparatus for processing information representing a source signal conveying content intended for human perception, the apparatus comprising:

means for receiving first spectral components that were generated by application of an analysis filterbank to the source signal, wherein the first spectral components represent spectral content of the source signal expressed in a first subspace of a multidimensional space;

means for deriving one or more first intermediate components from at least some of the first spectral components, wherein at least some of the first intermediate components differ from the first spectral components from which they are derived;

means for forming a combination of the one or more first intermediate components according to at least a portion of one or more impulse responses to obtain one or more second intermediate components;

means for deriving one or more second spectral components from the one or more second intermediate components, wherein the second spectral components represent spectral content of the source signal expressed in a second subspace of the multidimensional space that includes a portion of the multidimensional space not included in the first subspace;

means for obtaining estimated measures of magnitude or phase using the first spectral components and the second spectral components; and means for applying an adaptive process to the first spectral components to generate processed information, wherein the adaptive process is responsive to the estimated measures of magnitude or phase.]

[34. The apparatus of claim 33, wherein:

the first spectral components are transform coefficients arranged in one or more blocks of transform coefficients that were generated by application of one or more transforms to one or more segments of the source signal; and the portions of the one or more impulse responses are based on frequency response characteristics of the one or more transforms, which are dependent on characteristics of one or more analysis window functions that were applied with the one or more transforms to the one or more segments of the source signal.]

[35. The apparatus according to claim 33 that further comprises means for obtaining estimated measures of magnitude or phase using one or more third spectral components that are derived from at least some of the one or more first spectral components.]

[36. The apparatus according to claim 35 wherein:

the first spectral components are transform coefficients arranged in one or more blocks of transform coefficients that were generated by application of one or more transforms to one or more segments of the source signal;

the third spectral components are derived from a combination of two or more of the first spectral components; and the estimated measures of magnitude or phase for a respective segment of the source signal are obtained adaptively using either the third spectral components or using the first and second spectral components.]

[37. The apparatus according to claim 35, wherein:

the first spectral components are transform coefficients arranged in one or more blocks of transform coefficients that were generated by application of one or more transforms to one or more segments of the source signal;

the third spectral components are derived from a combination of two or more of the first spectral components; and the estimated measures of magnitude or phase for at least some spectral content of a respective segment of the source signal are obtained using the third spectral components and the estimated measures of magnitude or phase for at least some of the spectral content of the respective segment of the source signal are obtained using the first and second spectral components.]

[38. The apparatus according to claim 35 that comprises means for obtaining measures of magnitude or phase adaptively using either the third spectral components or using the first and second spectral components.]

[39. The apparatus of claim 33 that comprises means for adapting the portion of the one or more impulse responses in response to a measure of spectral component significance.]

[40. The apparatus of claim 39, wherein the measure of spectral component significance is provided by a perceptual model that assesses perceptual significance of the spectral content of the source signal.]

[41. The apparatus of claim 39, wherein the measure of spectral component significance reflects isolation in frequency of one or more spectral components.]

[42. The apparatus of claim 33, wherein:

the first spectral components are first transform coefficients arranged in one or more blocks that were generated by application of one or more transforms to one or more segments of the source signal, a respective block having a first number of first transform coefficients;

the second spectral components are second transform coefficients;

a second number of second transform coefficients are derived that represent spectral content that is also represented by some of the first transform coefficients in the respective block; and the second number is less than the first number.]

[43. The apparatus according to claim 33 that comprises:

means for applying the adaptive process to the first spectral components to generate synthesized spectral components;

means for deriving one or more third intermediate components from the first spectral components and/or the second spectral components and from the synthesized spectral components; and means for generating one or more output signals conveying content intended for human perception by applying one or more synthesis filterbanks to the one or more third intermediate components.]

[44. The apparatus according to claim 33 that comprises:

means for generating the first spectral components by applying the analysis filter bank to the source signal;

means for applying the adaptive process to the first spectral component to generate encoded information representing at least some of the first spectral components; and means for generating an output signal conveying the encoded information.]

*45. A method of generating time domain signals from first spectral components representing signals conveying content intended for human perception, the method comprising:*

*estimating from at least some of the first spectral components, MDST coefficients and measures of at least one of magnitude and phase, wherein the estimating of the MDST coefficients excludes from calculations portions of impulse responses that are of lesser significance;*

*generating second spectral components using at least some of the first spectral components, at least some of the estimated MDST coefficients, and at least some of the estimated measures of at least one of magnitude and phase; and*

*applying a synthesis filterbank to the generated second spectral components to generate the time domain signals;*

*causing output of the time domain signals;*

*wherein the method is performed by one or more computing devices.*

*46. The method of claim 45, wherein the step of generating second spectral components uses perceptual models to determine adaptive quantization levels.*

*47. The method of claim 45, wherein the first spectral components are composite representations.*

*48. The method of claim 45, wherein the first spectral components are coupled representations.*

*49. The method of claim 45, wherein the step of generating second spectral components uses spectral component regeneration.*

*50. An apparatus for generating time domain signals from first spectral components representing signals conveying content intended for human perception, comprising:*

*an estimation device that estimates from at least some of the first spectral components, MDST coefficients and measures of at least one of magnitude and phase, wherein the estimating of the MDST coefficients excludes from calculations portions of impulse responses that are of lesser significance;*

*a decoder that generates second spectral components using at least some of the first spectral components, at least some of the MDST coefficients, and at least some the estimated measures of at least one of magnitude and phase; and*

*a synthesis filterbank that generates the time domain signals from the second spectral components and causes output of the time domain signals.*

*51. The apparatus of claim 50, wherein the decoder uses perceptual models to determine adaptive quantization levels.*

*52. The apparatus of claim 50, wherein the first spectral components are composite representations.*

*53. The apparatus of claim 50, wherein the first spectral components are coupled representations.*

*54. The apparatus of claim 50, wherein the decoder uses spectral component regeneration.*

*55. A non-transitory computer readable medium storing a program of instructions that is executable by a device to perform a method of generating time domain signals from first spectral components representing signals conveying content intended for human perception, the method comprising:*

*estimating from at least some of the first spectral components, MDST coefficients and measures of at least one of magnitude and phase, wherein the estimating of the MDST coefficients excludes from calculations portions of impulse responses that are of lesser significance;*

*generating second spectral components using at least some of the first spectral components, at least some of the MDST coefficients, at least some of the estimated measures of at least one of magnitude and phase; and*

*applying a synthesis filterbank to the generated second spectral components to generate the time domain signals;*

*causing output of the time domain signals.*

*56. The non-transitory computer readable medium of claim 55, wherein the step of generating second spectral components uses perceptual models to determine adaptive quantization levels.*

*57. The non-transitory computer readable medium of claim 55, wherein the first spectral components are composite representations.*

*58. The non-transitory computer readable medium of claim 55, wherein the first spectral components are coupled representations.*

*59. The non-transitory computer readable medium of claim 55, wherein the step of generating second spectral components uses spectral component regeneration.*

*60. The method of claim 45, wherein the estimating step further comprises:*

*adaptively estimating measures of the at least one of magnitude and phase using either one or more third spectral components or using the first and second spectral components;*

*wherein the one or more third spectral components are derived from at least some of the first spectral components.*

*61. The apparatus of claim 50, wherein the estimation device adaptively estimates measures of the at least one of magnitude and phase using either one or more third spectral components or using the first and second spectral components, wherein the one or more third spectral components are derived from at least some of the first spectral components.*

*62. The non-transitory computer readable medium of claim 55, wherein the estimating step further comprises:*

*adaptively estimating measures of the at least one of magnitude and phase using either one or more third spectral components or using the first and second spectral components;*

*wherein the one or more third spectral components are derived from at least some of the first spectral components.*

* * * * *